(12) United States Patent
Lee et al.

(10) Patent No.: US 9,741,290 B1
(45) Date of Patent: Aug. 22, 2017

(54) MULTI-MODE DISPLAY

(71) Applicant: SecuGen Corporation, Santa Clara, CA (US)

(72) Inventors: Dong Won Lee, San Jose, CA (US); Jae Hyeong Kim, San Ramon, CA (US); Jae Ho Kim, San Jose, CA (US); Ye Seon Lee, San Jose, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

(21) Appl. No.: 15/260,237

(22) Filed: Sep. 8, 2016

Related U.S. Application Data

(60) Provisional application No. 62/357,300, filed on Jun. 30, 2016.

(51) Int. Cl.
*G06F 3/042* (2006.01)
*G09G 3/3233* (2016.01)
*G09G 3/34* (2006.01)

(52) U.S. Cl.
CPC ......... *G09G 3/3233* (2013.01); *G09G 3/3406* (2013.01); *G06F 3/0428* (2013.01); *G09G 2300/0852* (2013.01); *G09G 2330/021* (2013.01); *G09G 2360/148* (2013.01)

(58) Field of Classification Search
USPC ........................................ 345/175; 178/18.09
See application file for complete search history.

(56) References Cited

U.S. PATENT DOCUMENTS

| 7,061,452 | B2* | 6/2006 | Inoue | G09G 3/3233 345/207 |
| 7,898,619 | B2* | 3/2011 | Katoh | G02F 1/13306 349/116 |
| 8,730,211 | B2* | 5/2014 | Cheng | G06F 3/0412 345/173 |
| 8,917,387 | B1* | 12/2014 | Lee | G06K 9/0004 356/71 |
| 2004/0125053 | A1* | 7/2004 | Fujisawa | G06F 1/1613 345/76 |
| 2005/0099372 | A1* | 5/2005 | Nakamura | G06F 3/0412 345/79 |
| 2005/0200291 | A1* | 9/2005 | Naugler, Jr. | G06F 3/0412 315/149 |
| 2005/0218302 | A1* | 10/2005 | Shin | G02F 1/13318 250/214 R |
| 2007/0063993 | A1* | 3/2007 | Shishido | G09G 3/3241 345/175 |

(Continued)

OTHER PUBLICATIONS

Eric A. Vittoz, Low Power Design, Feb. 1994.*

*Primary Examiner* — Chad Dicke
(74) *Attorney, Agent, or Firm* — Silicon Valley Patent Group LLP; Thomas Chen

(57) ABSTRACT

Methods and apparatuses are provided for a multi-mode display. In one embodiment, a multi-mode display comprises an array of light sensing and emitting units (LSEUs), a decoder configured to generate addresses for accessing one or more LSEUs in the array of LSEUs, and a controller configured to control the array of LSEUs using the addresses, where each LSEU in the array of LSEUs comprises a light sensing and emitting component (LSEC), an emitting circuit configured to generate light using the LSEC, and a sensing circuit configured to detect light using the LSEC.

29 Claims, 27 Drawing Sheets

(56) References Cited

U.S. PATENT DOCUMENTS

| | | | |
|---|---|---|---|
| 2009/0219186 A1* | 9/2009 | Ishihara | H04B 1/12 341/155 |
| 2010/0097334 A1* | 4/2010 | Choi | G06F 3/042 345/173 |
| 2010/0141623 A1* | 6/2010 | Nakanishi | G09G 3/3406 345/207 |
| 2011/0001711 A1* | 1/2011 | Choi | G06F 3/042 345/173 |
| 2011/0050600 A1* | 3/2011 | Kim et al. | G02F 1/13338 345/173 |
| 2011/0108704 A1* | 5/2011 | Kim et al. | H04N 9/045 250/208.1 |
| 2011/0115733 A1* | 5/2011 | Shih | G06F 3/0412 345/173 |
| 2011/0291013 A1* | 12/2011 | Kurokawa | H01L 31/0232 250/338.1 |
| 2012/0092302 A1* | 4/2012 | Imai | G06F 3/0412 345/175 |
| 2014/0355846 A1* | 12/2014 | Lee | G06K 9/0004 382/124 |
| 2015/0364107 A1* | 12/2015 | Sakariya et al. | G06F 3/0412 345/174 |
| 2016/0246422 A1* | 8/2016 | Tan | G06F 3/0412 |
| 2016/0253012 A1* | 9/2016 | Yang | G06F 3/041 |
| 2016/0253014 A1* | 9/2016 | Yang | G09G 3/32 |
| 2016/0268982 A1* | 9/2016 | Sugizaki et al. | H03F 3/082 |

* cited by examiner

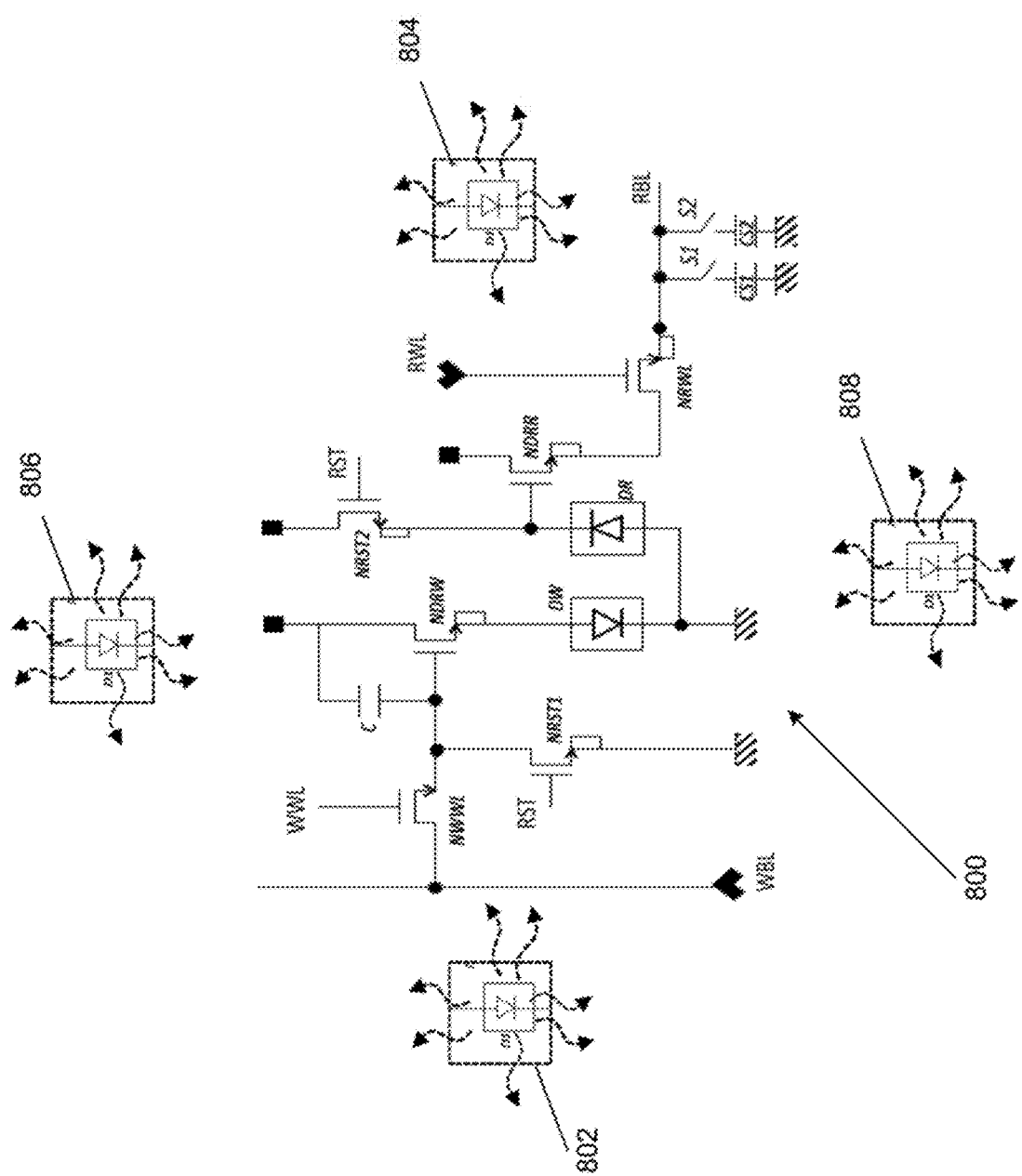

MULTI-MODE DISPLAY

CROSS REFERENCE TO RELATED APPLICATION

This application claims the benefit of U.S. provisional patent application No. 62/357,300, "A Multi-Mode Display," filed Jun. 30, 2016, which is assigned to the assignee hereof. The aforementioned United States patent application is hereby incorporated by reference in its entirety.

FIELD

The present invention relates to the field of user interface with a display. In particular, the present invention relates to a multi-mode display.

SUMMARY

Methods and apparatuses are provided for a multi-mode display that can be configured to support both sensing and emitting operations. The multi-mode display may include a plurality of cells. Each cell in the plurality of cells may be configured to perform both emitting and sensing operations, or separate components may be designated for each of the emitting and sensing operation so that each operation, either emitting or sensing, may be optimized. Through this dual functionality, a multi-mode display panel constructed using these cells may be used as a display, a fingerprint sensor, multi-finger sensor, palm print sensor, a hovering detector, a touchscreen with pressure detection capability, or any combinations thereof.

In one embodiment, a multi-mode display may include an array of light sensing and emitting units (LSEUs), a decoder configured to generate addresses for accessing one or more LSEUs in the array of LSEUs, and a controller configured to control the array of LSEUs using the addresses, where each LSEU in the array of LSEUs comprises a light sensing and emitting component (LSEC), an emitting circuit configured to generate light using the LSEC, and a sensing circuit configured to detect light using the LSEC.

According to aspects of the present disclosure, the LSEC may include a first light emitting circuit configured to control a diode to generate light in a light emitting operation of the LSEC, and a first light sensing circuit configured to control the diode to detect light in a light sensing operation of the LSEC.

The first light emitting circuit may be further configured to store electric charges in an initialization phase of the light emitting operation in a capacitor, and set the diode in a forward bias condition for emitting light in an emitting phase of the light emitting operation. The first light sensing circuit may be further configured to discharge electric charges stored in the LSEU in an initialization phase of the light sensing operation, and set the diode in a reverse bias condition for detecting light in a sensing phase of the light sensing operation.

The LSEC may include a second light emitting circuit configured to control a light emitting diode to generate light in a light emitting operation of the LS EC, and a second light sensing circuit configured to control a light sensing diode to detect light in a light sensing operation of the LSEC.

The second light emitting circuit may be further configured to store electric charges in an initialization phase of the light emitting operation, and set the light emitting diode in a forward bias condition for emitting light in an emitting phase of the light emitting operation. The second light sensing circuit may be further configured to discharge electric charges stored in the LSEU in an initialization phase of the light sensing operation, and set the light sensing diode in a reverse bias condition for detecting light in a sensing phase of the light sensing operation.

In some implementations, the LSEC may be implemented with CMOS transistors configured to reduce power consumption for the multi-mode display. In some other implementations, the LSEC is implemented with PMOS transistors configured to increase the light generated in the light emitting operation of the LSEC, and configured to reduce power consumption in the light sensing operation of the LSEC.

In another embodiment, a method for controlling a multi-mode display may include providing an array of light sensing and emitting units (LSEUs), where each LSEU in the array of LSEUs comprises a light sensing and emitting component (LSEC), generating addresses for accessing one or more LSEUs in the array of LSEUs with a decoder, and controlling the array of LSEUs using the addresses with a controller, where the controller includes an emitting circuit configured to generate light using the LSEC, and a sensing circuit configured to detect light using the LSEC.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIGS. 8A-8C illustrate emitting and sensing operations of the cell of FIG. 7 and according to aspects of the present disclosure.

DESCRIPTION OF EMBODIMENTS

Methods and apparatuses are provided for a multi-mode display. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
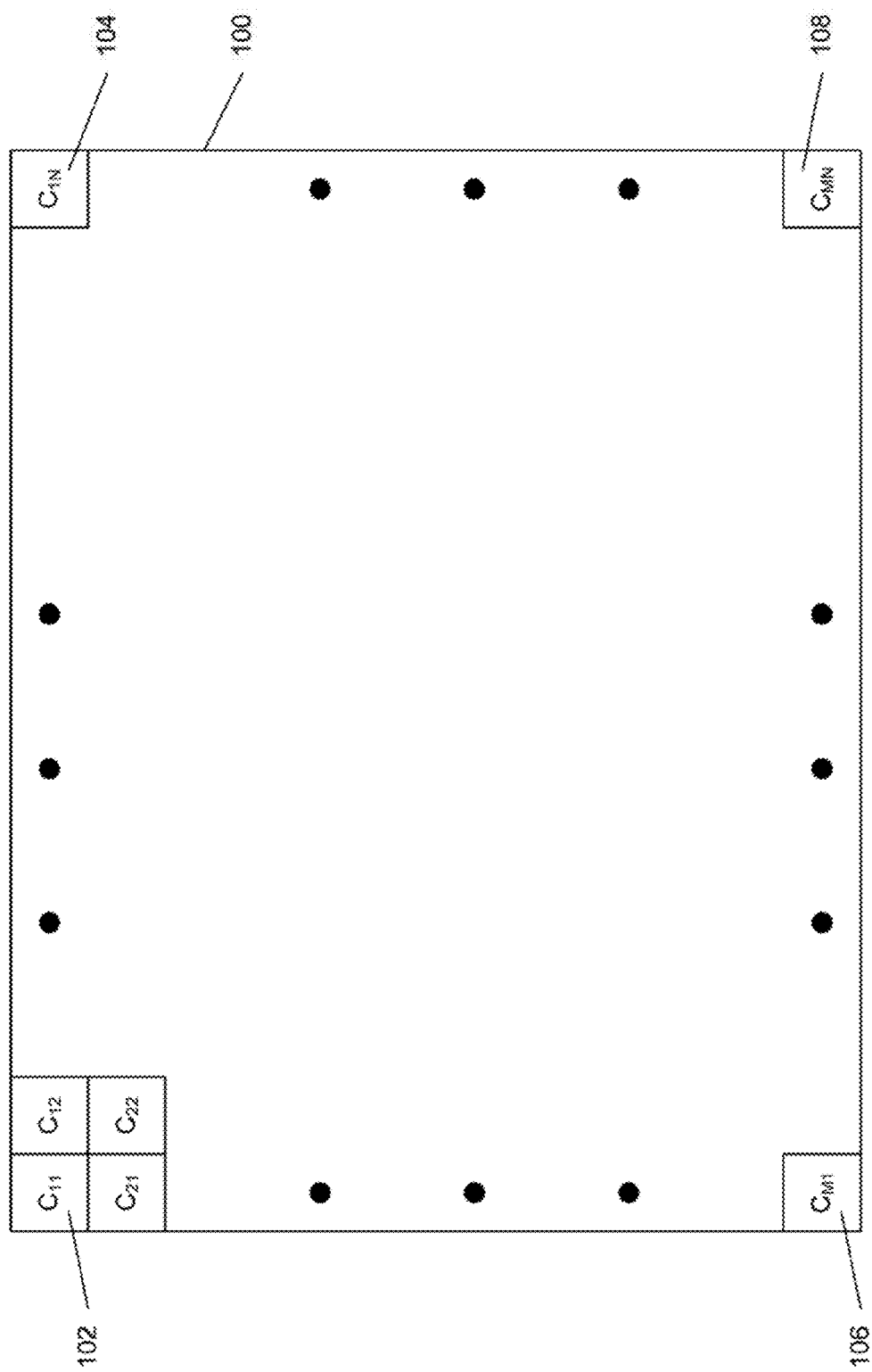
FIG. 1A illustrates an exemplary multi-mode display comprising a plurality of cells according to aspects of the present disclosure.

FIG. 1A illustrates an exemplary multi-mode display comprising a plurality of cells according to aspects of the present disclosure. In the example shown in FIG. 1A, the first row of the multi-mode display 100 may include cells from $C_{11}$ (102) to $C_{1N}$ (104), and the last row of the multi-mode display may include cells from $C_{M1}$ (106) to $C_{MN}$ (108). Similarly, the first column of the multi-mode display may include cells from $C_{11}$ (102) to $C_{M1}$ (106), and the last column may include cells from $C_{1N}$ (104) to $C_{MN}$ (108). The array of cells may be configured to cover the entire multi-mode display. According to aspects of the present disclosure, each cell in the plurality of cells of the multi-mode display 100 may be controlled individually. In addition, each cell of in the plurality of cells of the multi-mode display may be configured to emit light, sense light, emit light and sense light, or any combination thereof.

Figure 1B:
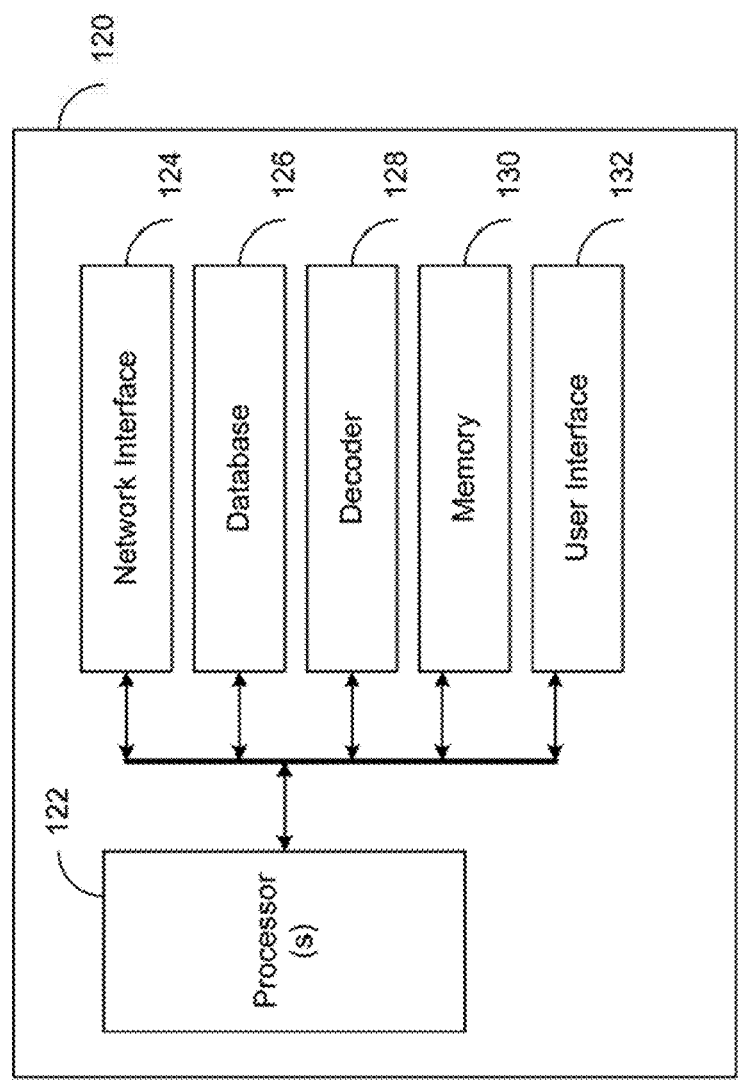
FIG. 1B illustrates an exemplary apparatus for controlling the multi-mode display according to aspects of the present disclosure.

FIG. 1B illustrates an exemplary apparatus for controlling the multi-mode display according to aspects of the present disclosure. As shown in FIG. 1B, a controller 120 of the apparatus may include one or more processors 122, a network interface 124, a database 126, a decoder 128, a memory 130, and a user interface 132. In some implementations, the apparatus may be a part of a mobile device.

Figure 1C:
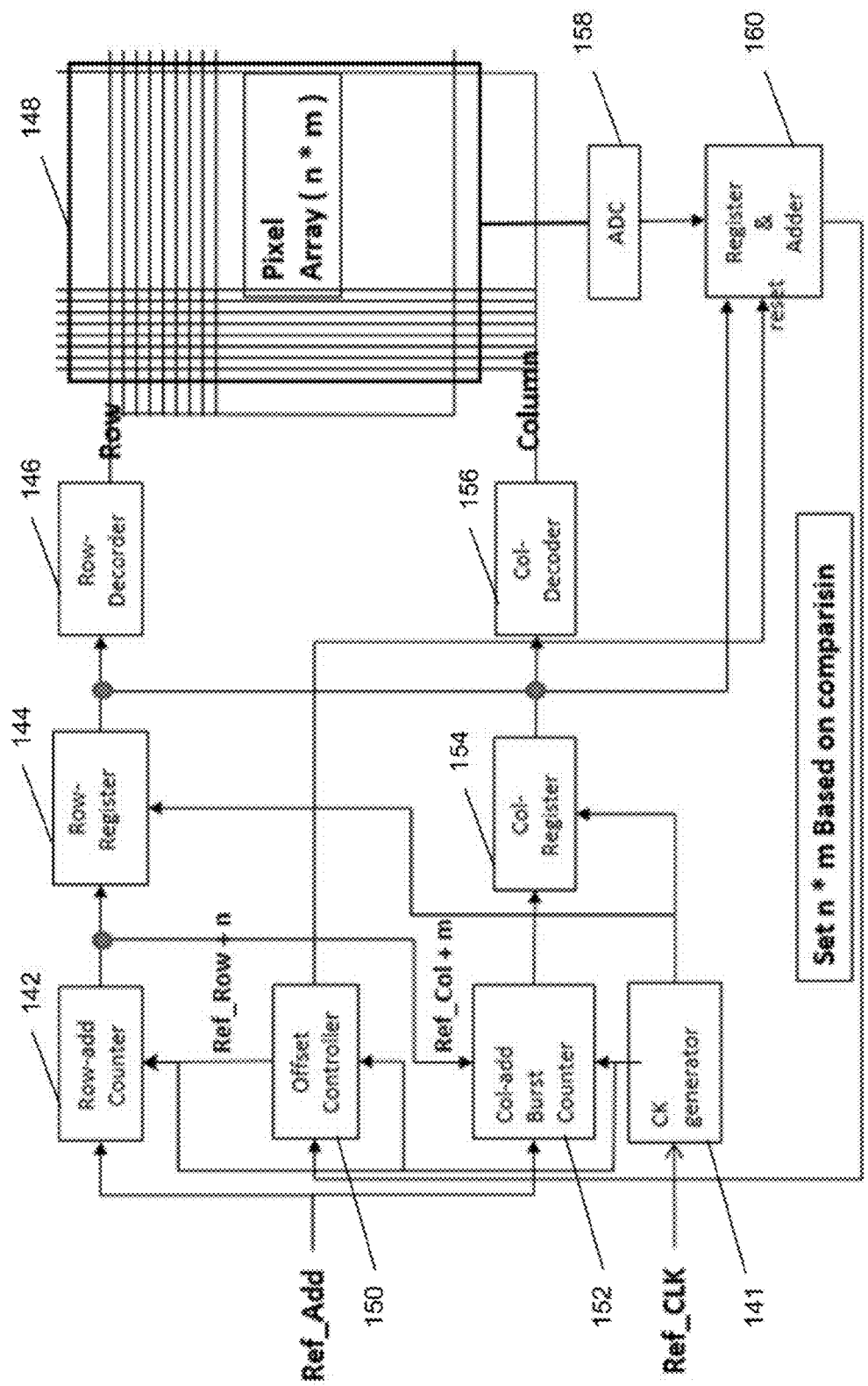
FIG. 1C illustrates an exemplary circuit for implementing a multi-mode display according to aspects of the present disclosure.

FIG. 1C illustrates an exemplary circuit for implementing a multi-mode display according to aspects of the present disclosure. In the exemplary implementation shown in FIG. 1C, the controller sends initial addresses containing row and column information for an array of pixels. Based on the initial address (Ref_Add), the controller starts with a row first triggered by the rising edge of a clock, generated by an internal clock generator 141. The enabling time of the row can be based on the number of clock cycles, which are established by the offset controller 150. The output of the row address counter 142 is stored in a row register 144, and then enters into a row decoder 146, which can decode the row address to select one pixel from among a row of pixels in a pixel array 148.

While the row lines are turned on, the column number, which may also be set by the offset controller 150, is turned on to obtain pixel information. The column number is output from the column burst address burst counter 152, is stored in a column register 154, and is entered into the column decoders 156 to select one column within the pixel array. The number of columns may also be set by the offset controller 150, which is controlled by initial values of d and s.

Each column supplies pixel information that can be converted into digital information and stored into registers, such as column register. An optional Analog-Digital Converter (ADC) 158 may be used to convert signals from pixel array 148 for use by a register and adder block 160. An operation, such as an addition, can be performed by the register and adder block 160 on registers to generate a value for one pixel image that corresponds to the initial address. Other types of operations may be performed on the registers, such as calculating the average or median value. Some of the advantages of using the addition operation are that it is efficient and it does not require extra calculations, and it yields a wide range of output values that can be used to improve image quality.

Figure 2A:
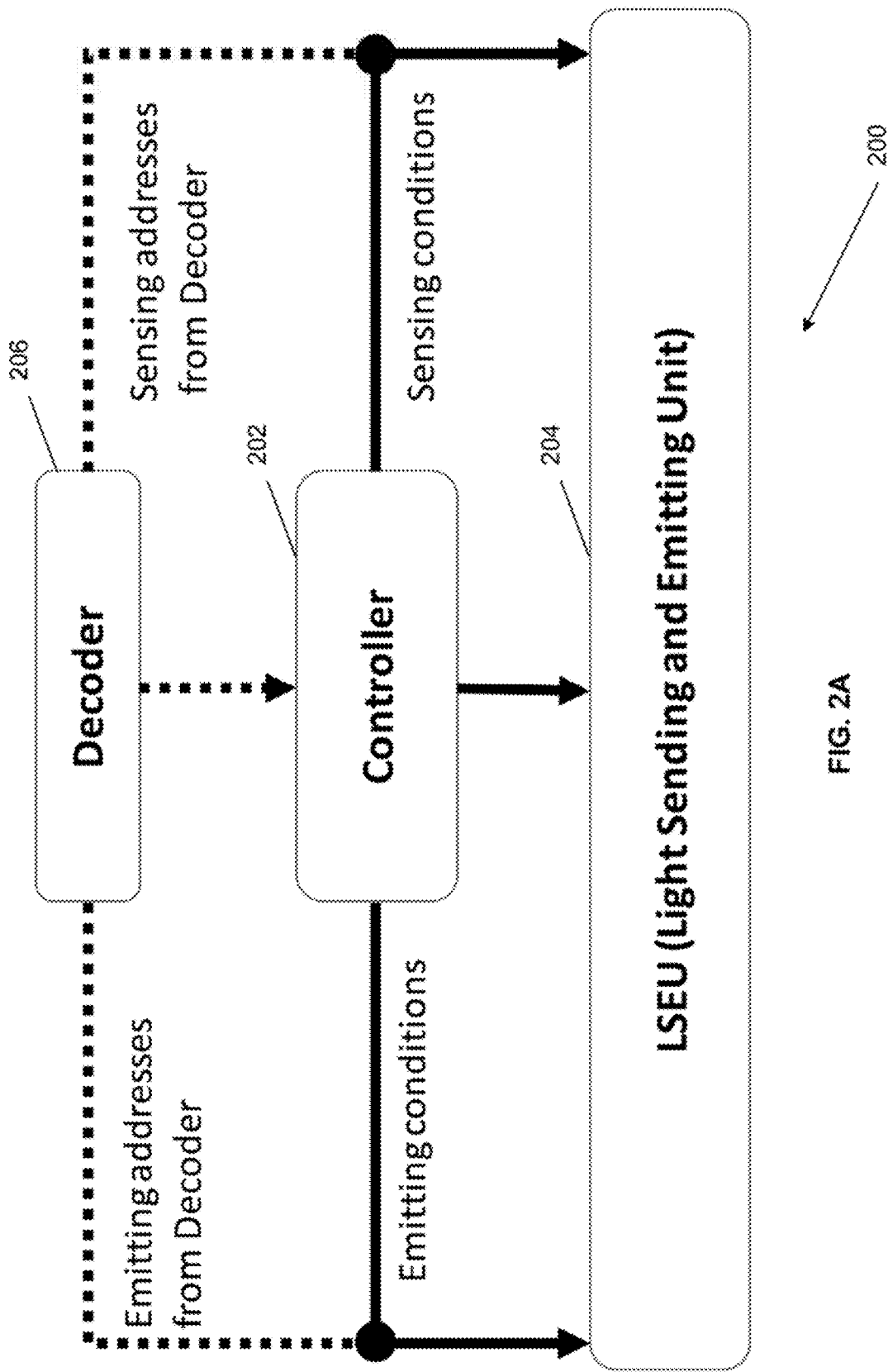
FIG. 2A illustrates exemplary components of a cell in a plurality of cells of a multi-mode display according to aspects of the present disclosure.

FIG. 2A illustrates exemplary components of a cell in a plurality of cells of a multi-mode display according to aspects of the present disclosure. According to aspects of the present disclosure, a cell 200 in the multi-mode display may include a Controller 202 and a Light Sensing and Emitting Unit (LSEU) 204. In addition, a cell 200 in the multi-mode display may optionally include a Decoder 206, alternatively and/or additionally.

In some implementations, the LSEU 204 may include a Light Sensing and Emitting Component (LSEC), an Emitting Circuit and a Sensing Circuit. Note that the LSEC can be implemented as one component that can both emit and sense light such as OLED, or can be implemented as a combination of separate light emitting component and light sensing components. For example, the light emitting component can be diode, LED, OLED, etc.; and the light sensing component can be diode, OLED, photo transistor, photo resistor, photo diode, etc.

The Emitting Circuit or Sensing Circuit may be configured to receive the address information from the Decoder to select a pixel from an array of LSEUs. By setting the timing from the Decoder, the emitting function and sensing function can be performed separately.

In case of emitting, the Emitting Circuit is set by Controller 202 and/or the Decoder 206 to let the LSEC emit light. The LSEC is set to have forwarding bias, with the pull-up driver on the anode side and the pull-down driver on the cathode side by the Controller 202. It sets VDD (Power supply voltage) on the anode side and VSS (circuit ground) on the cathode side. Note that in some implementations, setting the Controller 202 to the emitting condition shuts off the Sensing Circuit.

When data is to be read from the pixel, the Sensing Circuit gets address information from the Decoder 206. By setting the Controller 202 to obtain a reverse bias condition of the LSEC, the LSEC is set to the reverse bias condition, which sets VDD on the cathode side and VSS on the anode side.

In that condition, light comes from other pixels and the LSEC converts the light into leakage current. The leakage current is read twice—once in the initialization phase and once in the sensing phase of the sensing operation. By comparing these two values, the Sensing Circuit sends out sensed data from the pixel to output.

Figure 2B:
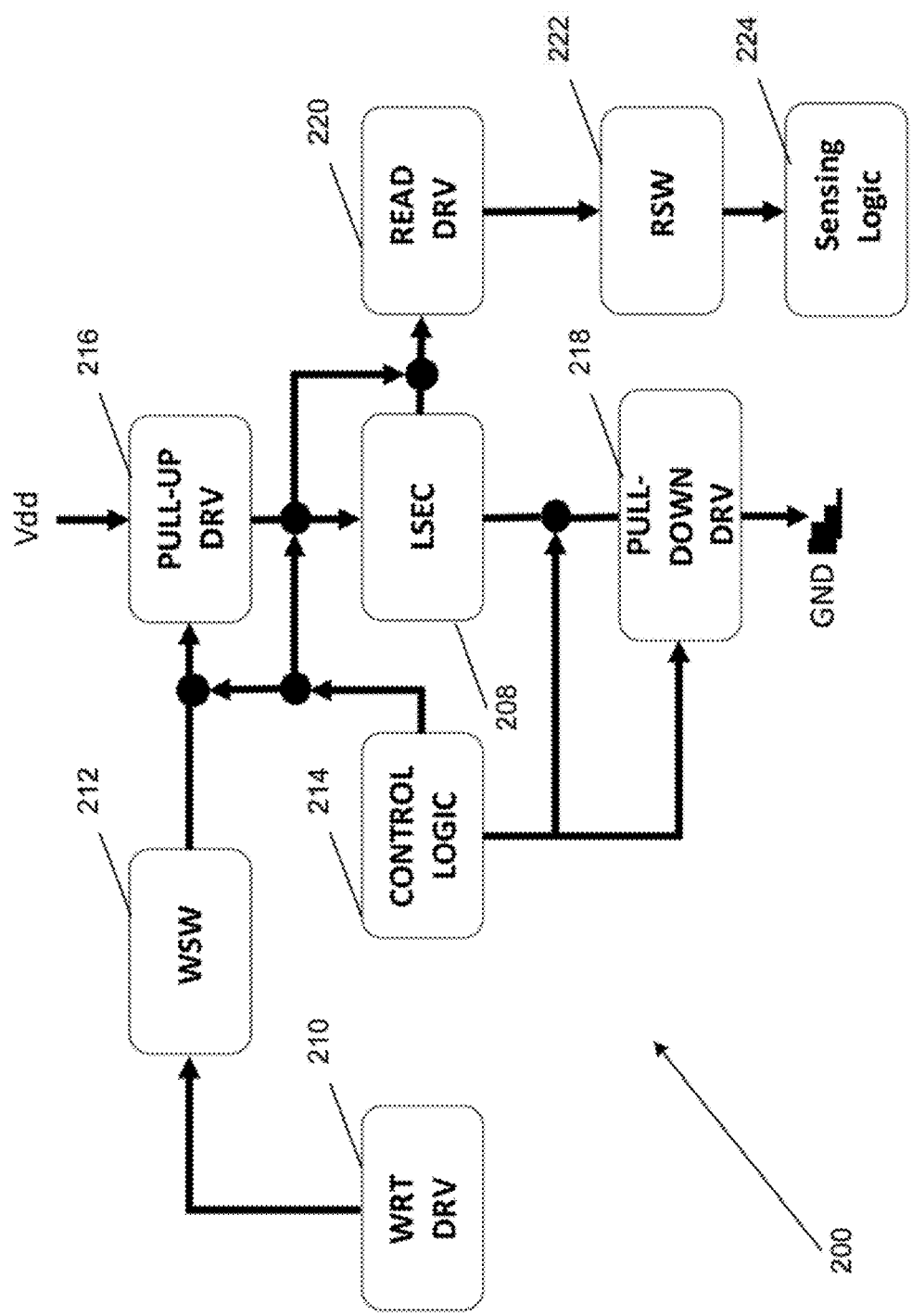
FIG. 2B illustrates an exemplary block diagram implementation of a cell of FIG. 2A according to aspects of the present disclosure.

FIG. 2B illustrates an exemplary block diagram implementation of a cell of FIG. 2A according to aspects of the present disclosure. In some implementations, each cell of the multi-mode display may include a write driver (WRT DRV) 210, a write switch (WSW) 212, a Control Logic 214, a pull-up driver (Pull-Up DRV) 216, a light sensing and emitting component (LSEC) 208, a pull-down driver (Pull-Down DRV) 218, a read driver (Read DRV) 220, a read switch (RSW) 222, and a Sensing Logic 224.

According to aspects of the present disclosure, WRT DRV 210 is configured to generate a voltage for turning on the pull-up driver. WSW 212 is configured to connect between WRT DRV and pull-up driver. Control Logic 214 is configured to reset the state of a cell between sensing and emitting operations. The Control Logic 214 is further configured to control transitions between sensing and emitting operations and to establish desired conditions for the execution of the sensing or emitting. For example, the Control Logic 214 may be configured to set the LSEC 208 into forward or reverse condition according to the type of operation being executed. PULL-UP DRV 216 is configured to provide power supply voltage to the anode side of the LSEC 208 during emitting operations and is configured to disable the LSEC 208 during sensing operations. PULL-DOWN DRV 218 is configured to sets the LSEC's cathode side to circuit ground. READ DRV 220 is configured to send leakage current to the sensing logic. RSW 222 is configured to connect the read driver and sensing logic. Sensing Logic 224 is configured to detect a difference between the statuses of the reset voltage and leakage voltage and sends the difference to output logic. Note that there may be differences between implementations using NMOS and CMOS structures, such as in the PULL_UP DRV 216 and the Control Logic 214. In some implementations, the Control Logic 214 may be integrated with the LSEC.

In a CMOS implementation, a PMOS transistor can be used as the PULL_UP DRV 216 instead of using a NMOS transistor to avoid the threshold voltage drop which usually happens in an NMOS transistor when it transfers the power supply voltage from drain to source.

To turn off a PMOS transistor, the gate is set to Vdd (power supply voltage). In contrast, to turn off an NMOS transistor, the gate is set to circuit ground. So to obtain correct bias condition according to PMOS and NMOS Driver, it is replaced with PMOS also in Control Logic 214. From the process point of view, by using two diodes instead of one, each cell can be tuned to obtain optimal process conditions for each diode. One of the diodes can be optimized for emitting, while the other diode can be optimized to detect light for producing leakage current.

Figure 3:
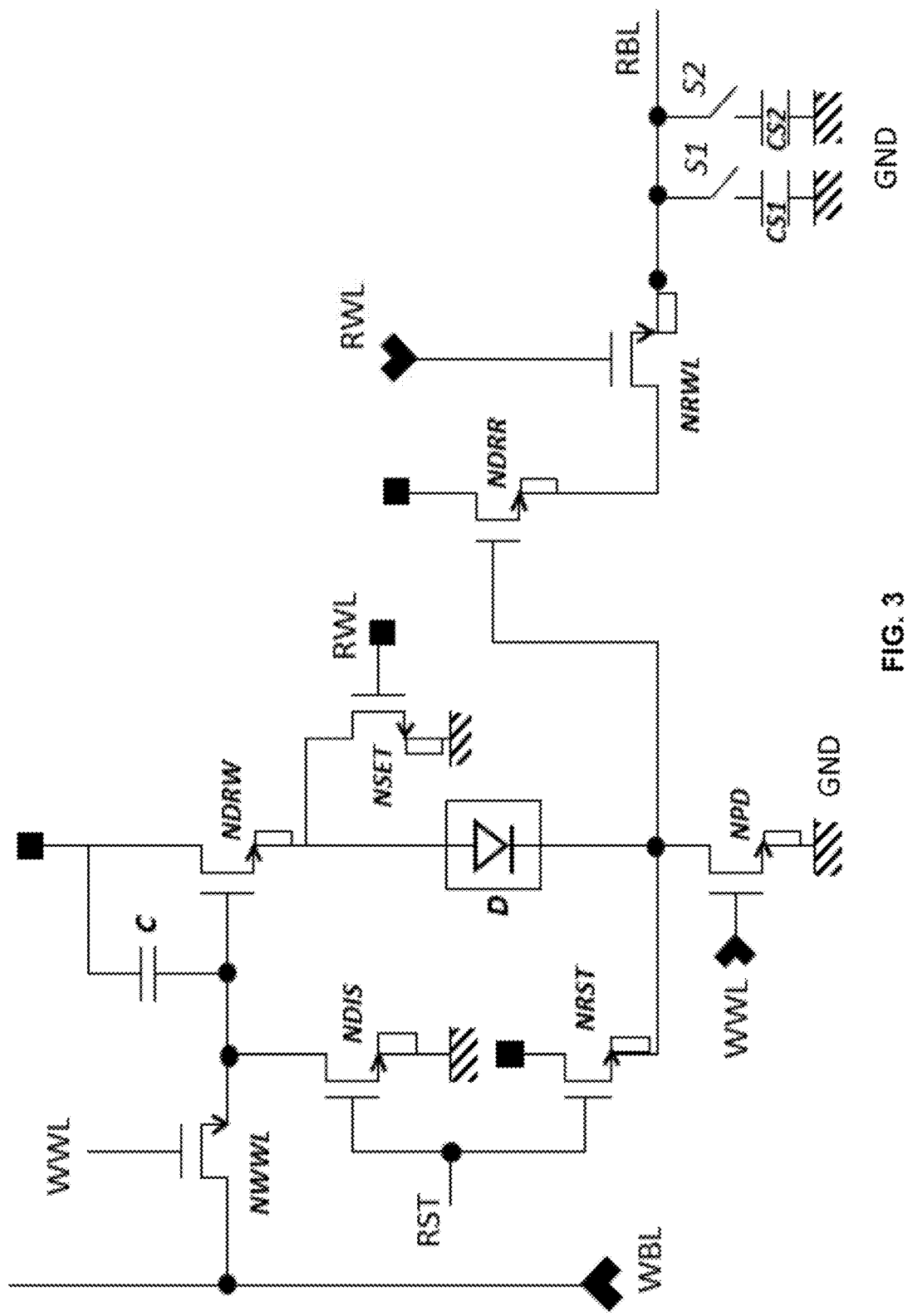
FIG. 3 illustrates an exemplary implementation of the cell of FIG. 2 using NMOS transistors according to aspects of the present disclosure.

FIG. 3 illustrates an exemplary implementation of the cell of FIG. 2 using NMOS transistors according to aspects of the present disclosure. In one embodiment, the cell includes NMOS transistors, capacitor, and diode. Through changing the timing of each NMOS transistor, the cell can be both written to (also referred to as emitting light) and read from (also referred to as sensing light). The cell can be configured to emit light by sending the forwarding bias current into the diode, and sensing can be done by detecting the difference in voltage between an initialized state and a reading state as a result of reverse leakage current affected by neighboring light sources.

Referring to FIG. 3, WWL represents the Write Word Line signal; WBL represents the Write Bit Line signal; RWL represents the Read Word Line signal; RST represents the Reset signal; NWWL represents the NMOS Write Word Line transistor; NDRW represents the NMOS write driver transistor; NDIS represents the NMOS Discharge transistor; NRST represents the NMOS Reset transistor; NPD represents the NMOS Pull Down transistor; NSET represents the NMOS Setting transistor; NDRR represents the NMOS Driver Read transistor; and NRWL represents the NMOS Read Word Line transistor.

According to aspects of the present disclosure, references to "low" or "low state" refer to a low voltage states and references to "high" or "high state" refer to a high voltage state. In digital integrated circuit design, a low state may be represented by a value of 0 and a high state may be represented by a value of 1. In analog integrated circuit design, depending on specific design and technology, different low voltage states with different low voltage values may be applicable to the specific design and technology. Similarly, different high voltage states with different high voltage values may be applicable to the specific design and technology.

Figure 4B:
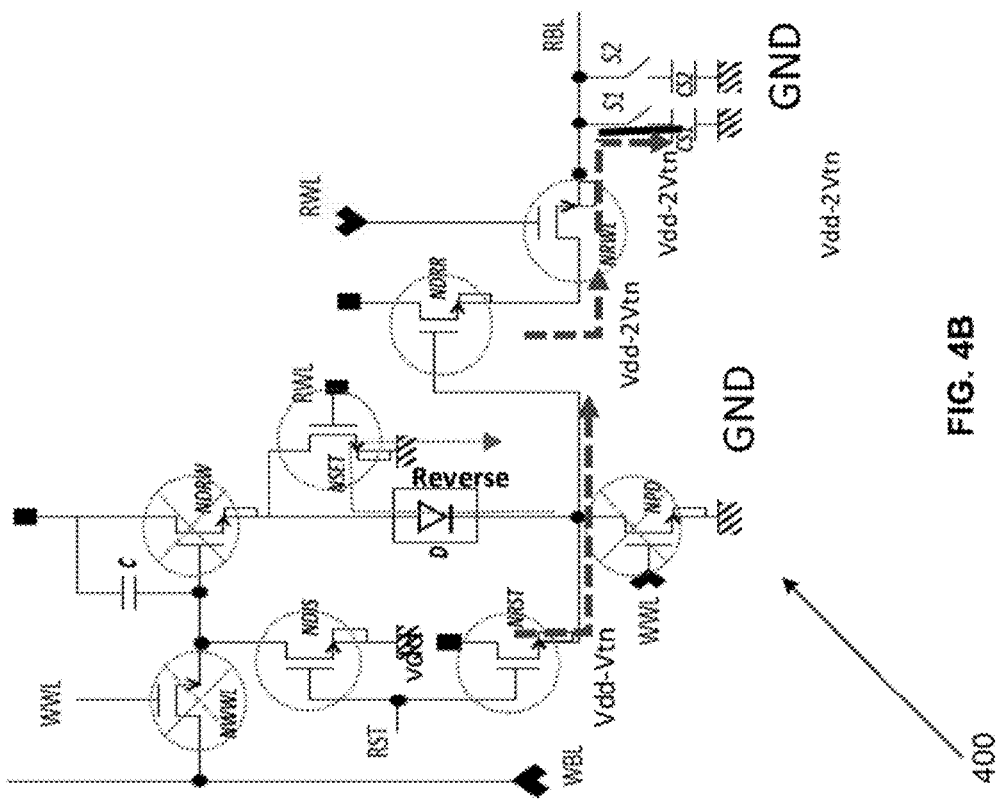
FIGS. 4A-4C illustrate emitting and sensing operations of the cell of FIG. 3
Figure 4A:
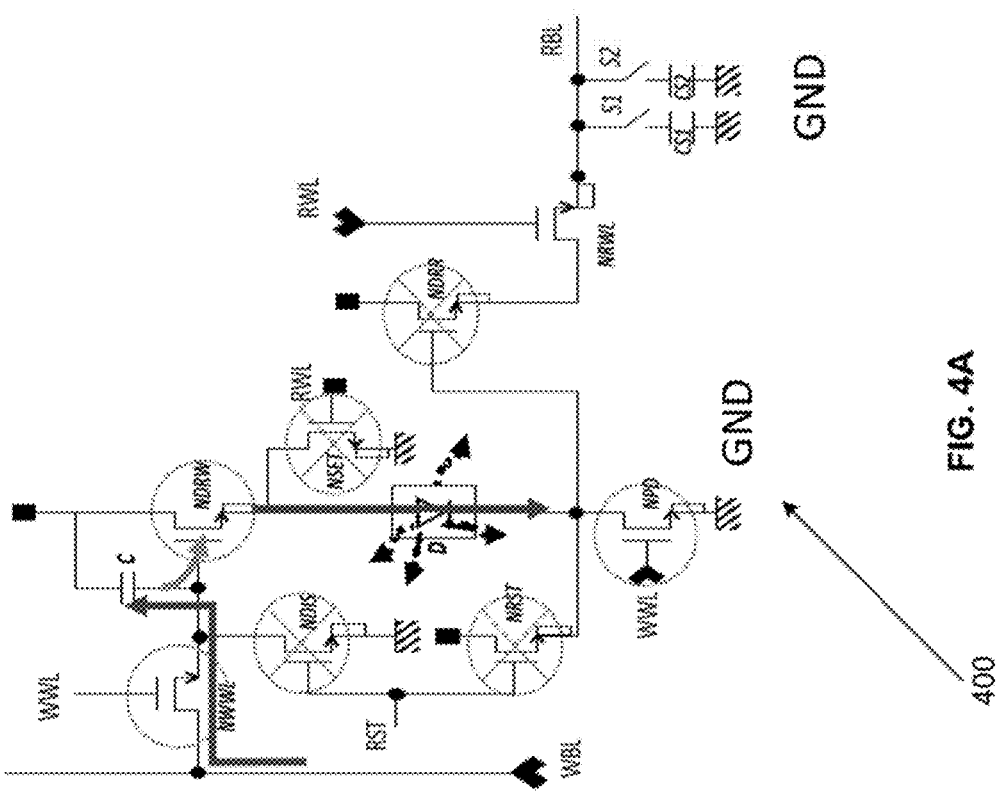
Figure 4C:
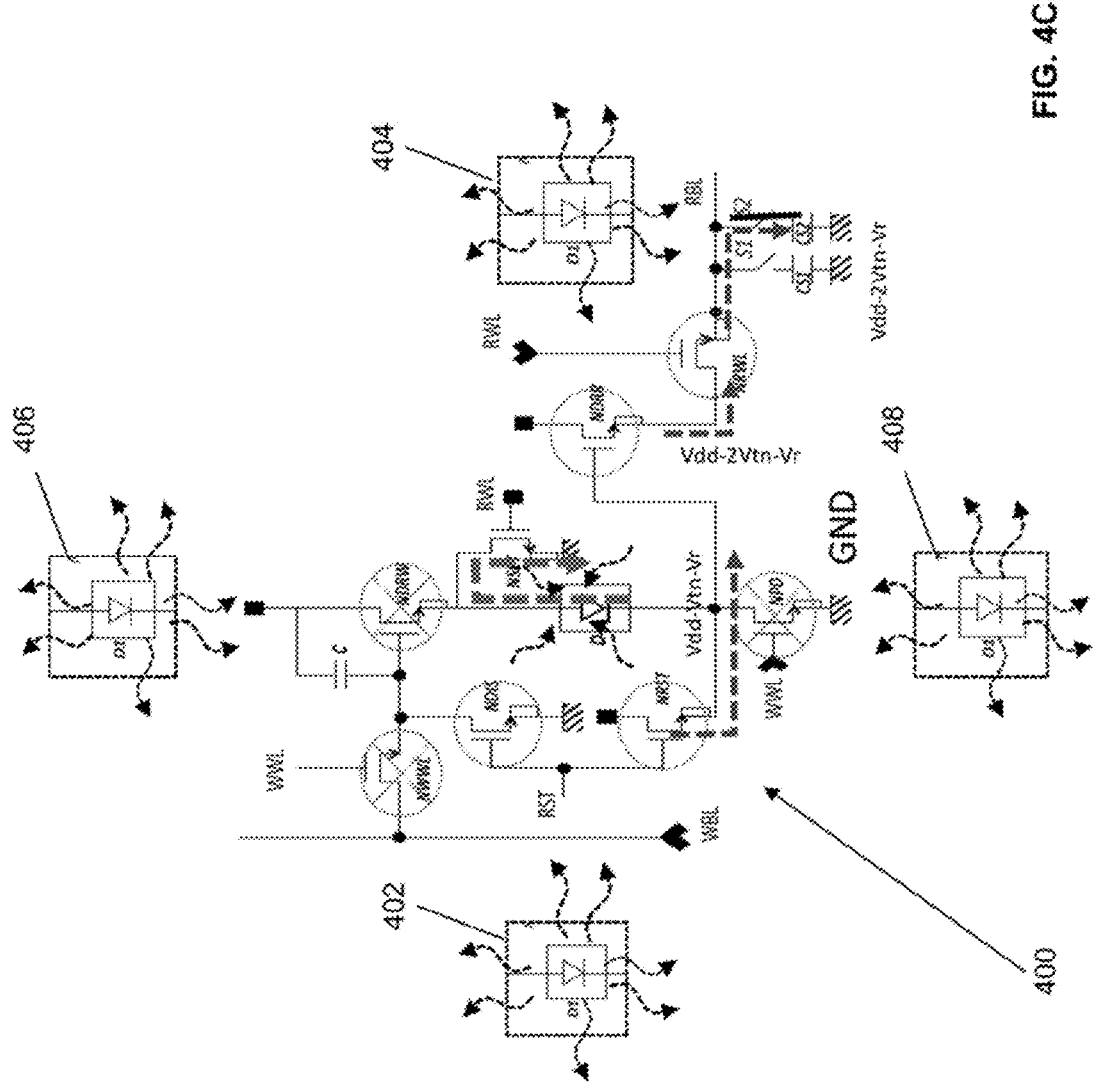

FIGS. 4A-4C illustrate emitting and sensing operations of the cell of FIG. 3 according to aspects of the present disclosure. FIG. 4A illustrates an exemplary implementation of cell 400 for emitting light (also referred to as light emitting operation) with the forward voltage at diode D. In the example shown in FIG. 4A, for an emitting operation, drivers attached to WBL are turned on to high before WWL (write word line) is switched to a high state. The resulting state allows current to flow from WBL across the transistor NWWL, charging the capacitor C. The length of time that WWL stays at high determines how much the capacitor C is charged. The charge on C determines the gate voltage of NDRW, which in turn determines the current flow through diode D. Since the WWL input is connected to the gate of the transistor NPD, current can flow from NDRW, through the diode D and down through NPD into circuit ground. By this action, the diode emits light at a certain desired intensity. The source voltage for NWWL may increase to V(wwl)-Vtn. Consequently, the source voltage of NDRW may increase to VDD-2Vtn, which may be configured to be high to satisfy the forward bias condition for the diode D.

During the emitting operation, the voltages at RST and RWL may stay at low, which shut off the transistors NDIS, NRST, NSET, and NRD (shown as a dotted circle enclosing a cross). Also, to increase the light efficiency, the body effect, which can affect the stability of Vtn, may need to be reduced, since Vtn can be undesirably high during operation. The cell's bulk bias (substrate) of each NMOS transistors may be connected to source terminal, which reduces the body effect.

Referring to FIG. 4B, during a sensing operation, the cell 400 detects light coming from adjacent cells or from other external sources. To set the cell into read mode, WWL is set to low, deactivating the transistors NWL, NDRW, and NPD (shown as a dotted circle enclosing a cross).

The RST signal can be set to high, activating the transistors NRST, NDIS, and NDRR. This sets the diode D into the reverse bias condition to detect the initialized state sampling and isolates it from WBL.

Light from adjacent cells creates leakage current in the diode that flows through NSET into circuit ground, reducing the gate voltage for NDR which was set to VDD-Vtn in the initialization phase. This in turn affects the current passing through NRWL. Thus, the intensity of light may control the NMOS (NRWL) current. The cell then detects signal sampling into column buffer2 by turning on $S_2$. The light intensity may be determined by comparing the currents read in initialization phase and sensing phase of the sensing operation. FIG. 4B illustrates an example of sensing at $S_1$ with reset condition of VDD-2Vtn. FIG. 4C illustrates and example of sensing at $S_2$ with the emitting light from adjacent cells and reverse voltage at diode D being Vdd-2Vtn-Vr. In FIG. 4C, 402, 404, 406, and 408 are symbolic representations (without details) of cells on left, right, top, and bottom of the cell shown in FIG. 4A and FIG. 4B. In this example, cells 402, 404, 406, and 408 are configured to emit light and cell 400 is configured to sense light.

Figure 4D:
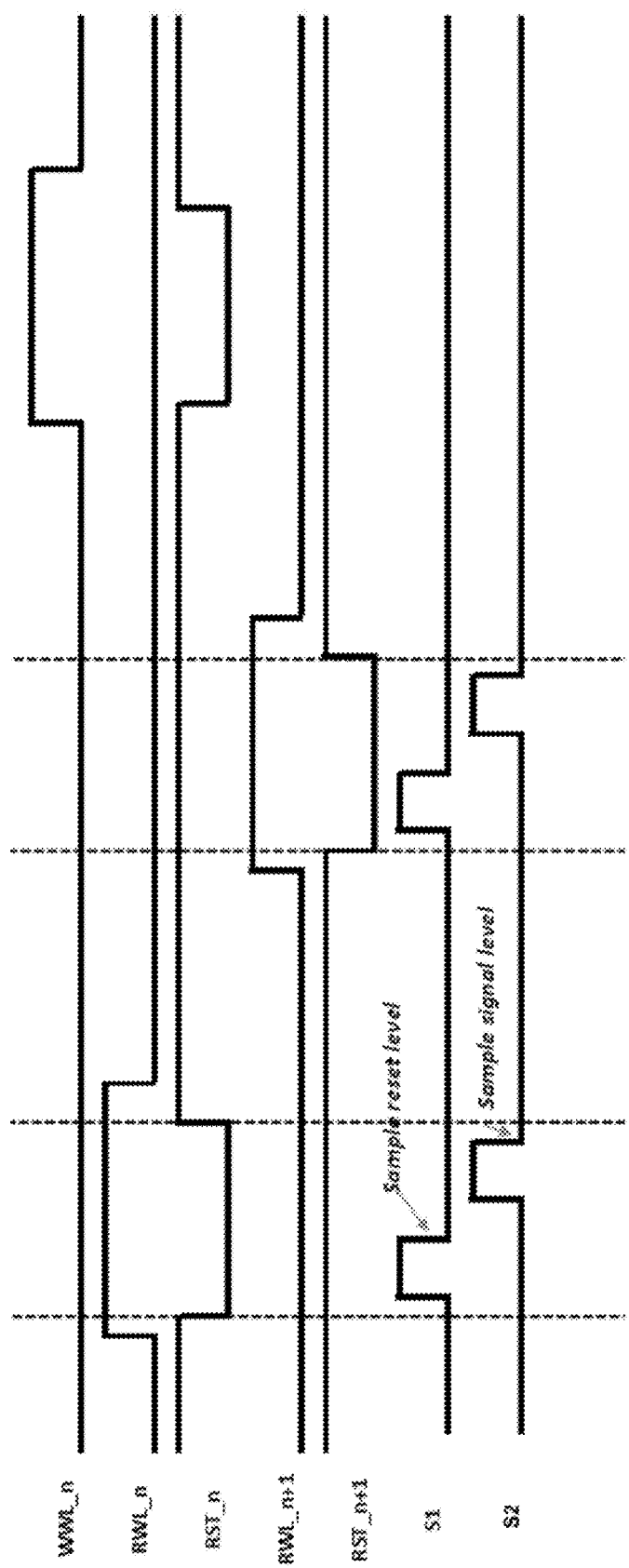
FIG. 4D illustrates a timing diagram of the cell of FIG. 3 according to aspects of the present disclosure.

FIG. 4D illustrates a timing diagram of the cell of FIG. 3 according to aspects of the present disclosure. In this example, n represents the condition of the control signals at period n; and n+1 represents the condition of the control signals at period n+1. For the light emitting operation, WWL is set to high to turn on NWWL, and RST is set to low to turn off NDIS and NRST, which causes the gate of NDRW to respond to WBL voltage. When WBL is set to high, NDRW turns on; this causes diode D to emit light. In case of the light sensing operation, RWL is set to high to turn on NRWL, and RST is set to low to turn off NRST. Based on these conditions, diode D is set to a reverse bias condition. By turning on the switch $S_1$, the initial state is stored onto capacitor $CS_1$. Then, $S_1$ turns off and $S_2$ switch turns on to store the reading state onto capacitor $CS_2$.

Figure 5:
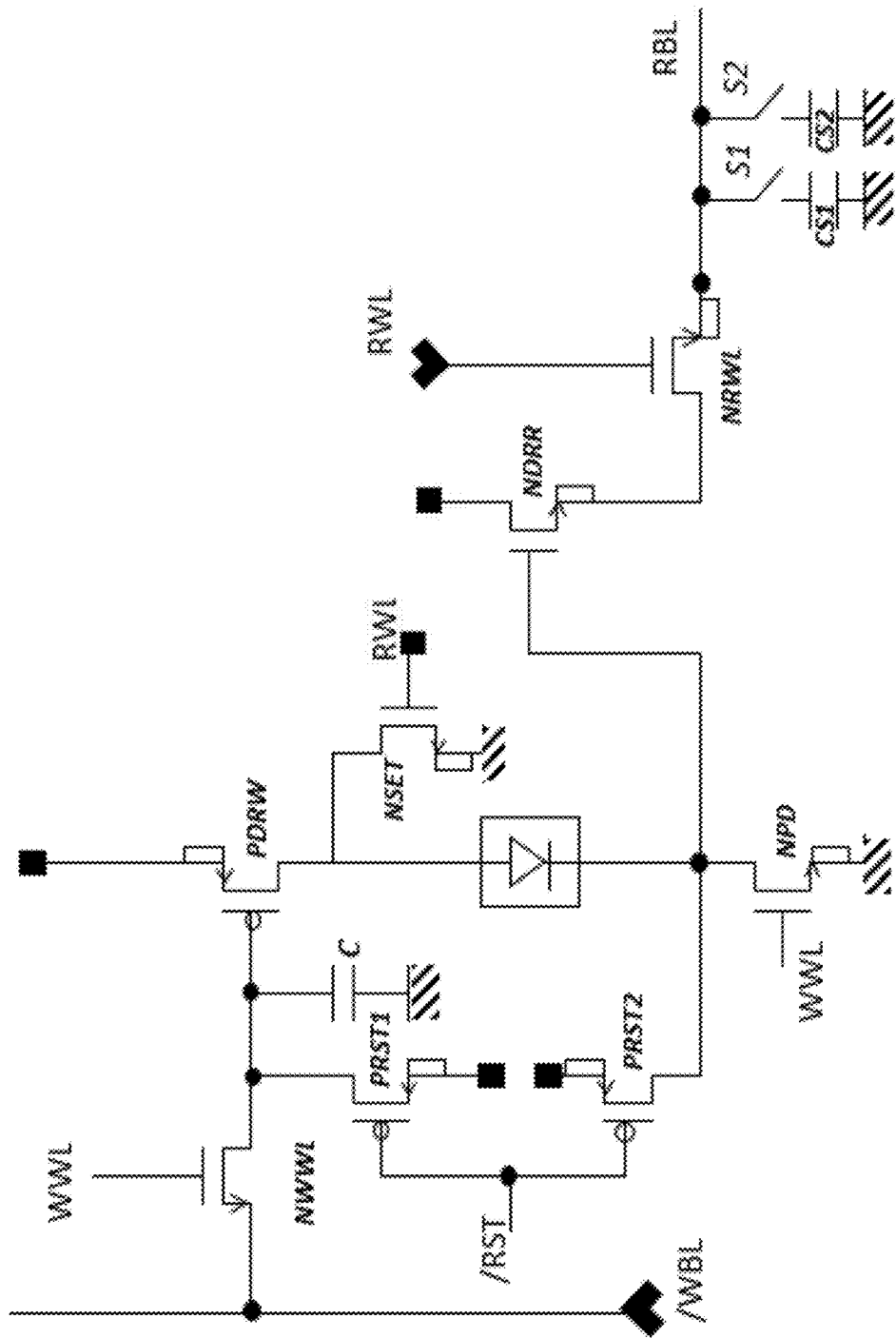
FIG. 5 illustrates an exemplary implementation of the cell of FIG. 2 using CMOS transistors according to aspects of the present disclosure.

FIG. 5 illustrates an exemplary implementation of the cell of FIG. 2 using CMOS transistors according to aspects of the present disclosure. In the example shown in FIG. 5, the cell includes NMOS and PMOS transistors, Capacitors, and Diode.

The CMOS implementations are preferable for low power operations. In some implementations, for example, applications for OLED and LCD may use 3.3V or lower as the power supply voltage (VDD). To achieve smaller chip size and lower power, these implementations may require low power supply voltage and shrinking of the semiconductor processing technology. Through using lower power supply voltages such as 1.2V or 0.9V, the power consumption of the multi-mode display may be reduced significantly. Note that with the NMOS implementation, it may be challenging to achieve lower power supply voltage, because of the threshold voltage (Vtn). Instead, an implementation using PMOS transistors along with NMOS transistors may lower power supply voltage by about 2.1 to 2.4V.

Referring to FIG. 5, NWWL represents the Write Word Line NMOS transistor; NRWL represents the Read Word Line NMOS transistor; PDRW represents the Write Driver PMOS transistor; NSET represents the NMOS Setting transistor; NDRR represents the Read Driver NMOS transistor; PRST1 and PRST 2 represent the Reset PMOS 1 transistor and the Reset PMOS 2 transistor, respectively; DW represents the Emitting Diode; NPD represents the Pull down NMOS transistor; and $CS_1$ and $CS_2$ represent the Sensing Capacitor 1 and the Sensing Capacitor 2, respectively.

Figures 6A, 6B:
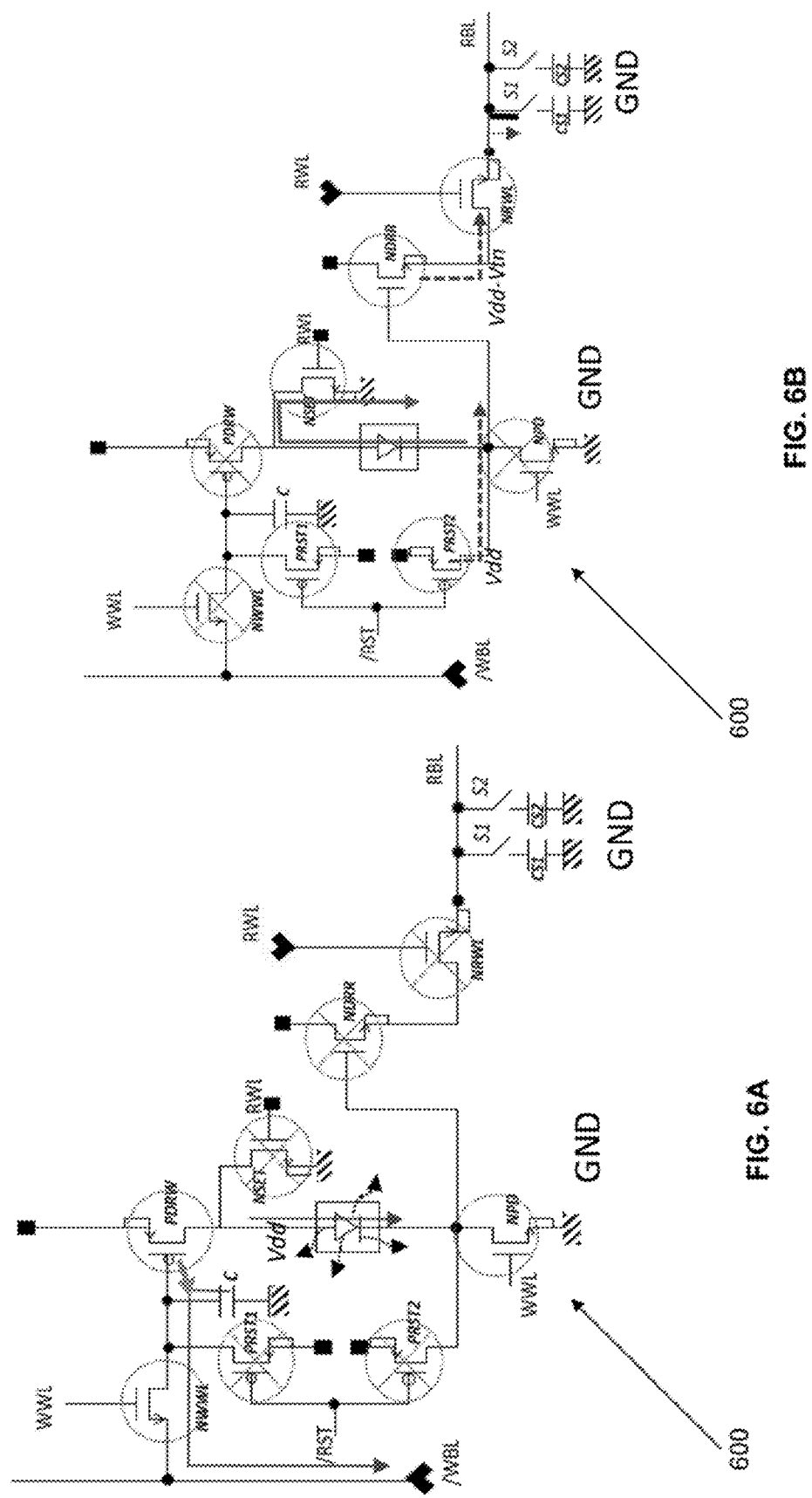
FIGS. 6A-6C illustrate emitting and sensing operations of the cell of FIG. 5
Figure 6C:
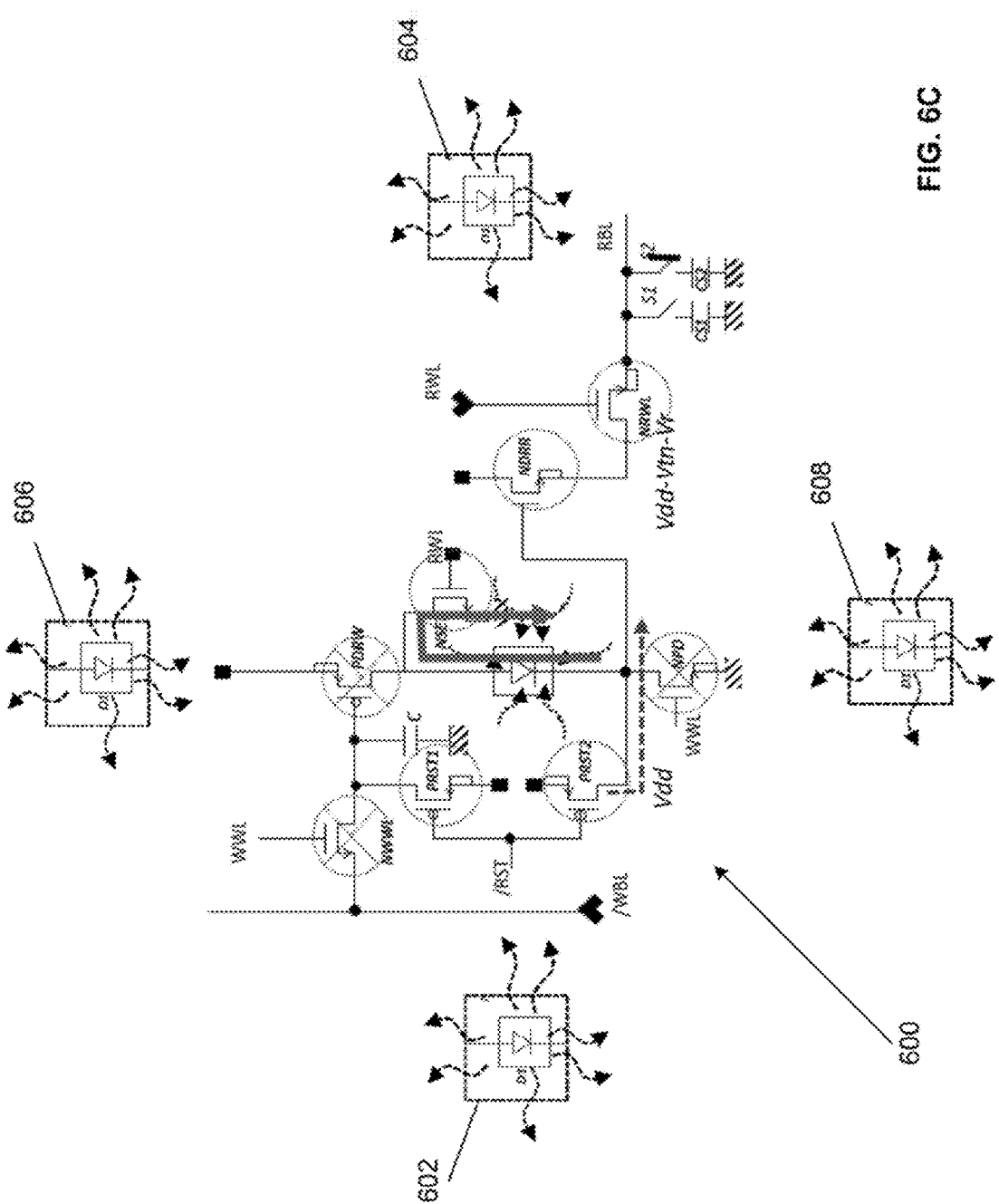

FIGS. 6A-6C illustrate emitting and sensing operations of the cell of FIG. 5 according to aspects of the present disclosure. In the exemplary implementation of cell 600 shown in FIG. 6A, before the emitting operation, the voltage of /WBL is pre-charged to VDD (high), and /RST is set to low to turn on PRST1, charging the capacitor C to VDD. Then WWL is set to high and /WBL, which is driven by the write driver, is set to low. The charge of the capacitor C is discharged to low, which activates the transistor PDRW. By turning on PDRW, the current flows from VDD to ground through diode, this causes the diode to emit light. FIG. 6A illustrates an example of emitting light (also referred to as light emitting operation) with the forward voltage at diode D.

With a NMOS implementation, there would have been a threshold voltage drop on the anode side of diode D, so that desirable current from the diode may not be obtained. For transistor PDRW, threshold voltage (Vtn) may be about 0.4 to 0.7V, and the drain side of PDRW has the same voltage as VDD (Power supply voltage) without voltage drop.

Referring to FIG. 6B, in an initialization phase of the sensing operation, /RST is set to low, turning off PDRW. WWL is also low. In this initialization phase, diode D is configured to be in the reverse mode and ready to sense light. During the initialization phase, the drain of PRST2 is set to high and NWWL is turned off. It generates a desirable leakage current for the diode D. The voltage at the NDRR gate increases VDD and the source voltage of NDRR increases to VDD instead of VDD-Vtn, as in the NMOS implementation. The source voltage of NDRR is controlled to be VDD-Vtn. Then RWL is set to high and leakage current through diode D is sampled at $CS_1$ by turning on $S_1$ switch, which is also referred to as the initialized state.

In the sensing phase of the sensing operation (also referred as the reading state), as the leakage current of diode D increases and the gate voltage of NDRR drops from VDD to VDD-Vr (as leakage current affects voltage). The leakage current is sampled at $CS_2$ by turning on the $S_2$ switch, which is also referred to as the reading state. In this manner, an image on the multi-mode display can be detected by comparing the leakage current detected in the initialized state and the reading state.

The range for gate voltage of NDRR is from VDD to VDD-Vr, instead of from VDD-Vtn to VDD-Vtn-Vr. With this approach, the drain voltage of PRST2 can be independent of Vtn, which has the same voltage as the gate of NDRR. In some embodiments, drain to source current may be proportional to the square of (Vgs-Vtn). By improving the one Vtn for Vgs of NDRR improves sensing current and improves the low voltage operation. FIG. 6B illustrates an example of sensing at $S_1$ with reset condition of VDD-2Vtn. FIG. 6C illustrates an example of sensing at $S_2$ with signal condition of Vdd-2Vtn-Vr. In FIG. 6C, 602, 604, 606, and 608 are symbolic representations (without details) of cells on left, right, top, and bottom of the cell 600 shown in FIG. 6A and FIG. 6B. In this example, cells 602, 604, 606, and 608 are configured to emit light and cell 600 is configured to sense light.

Figure 6D:
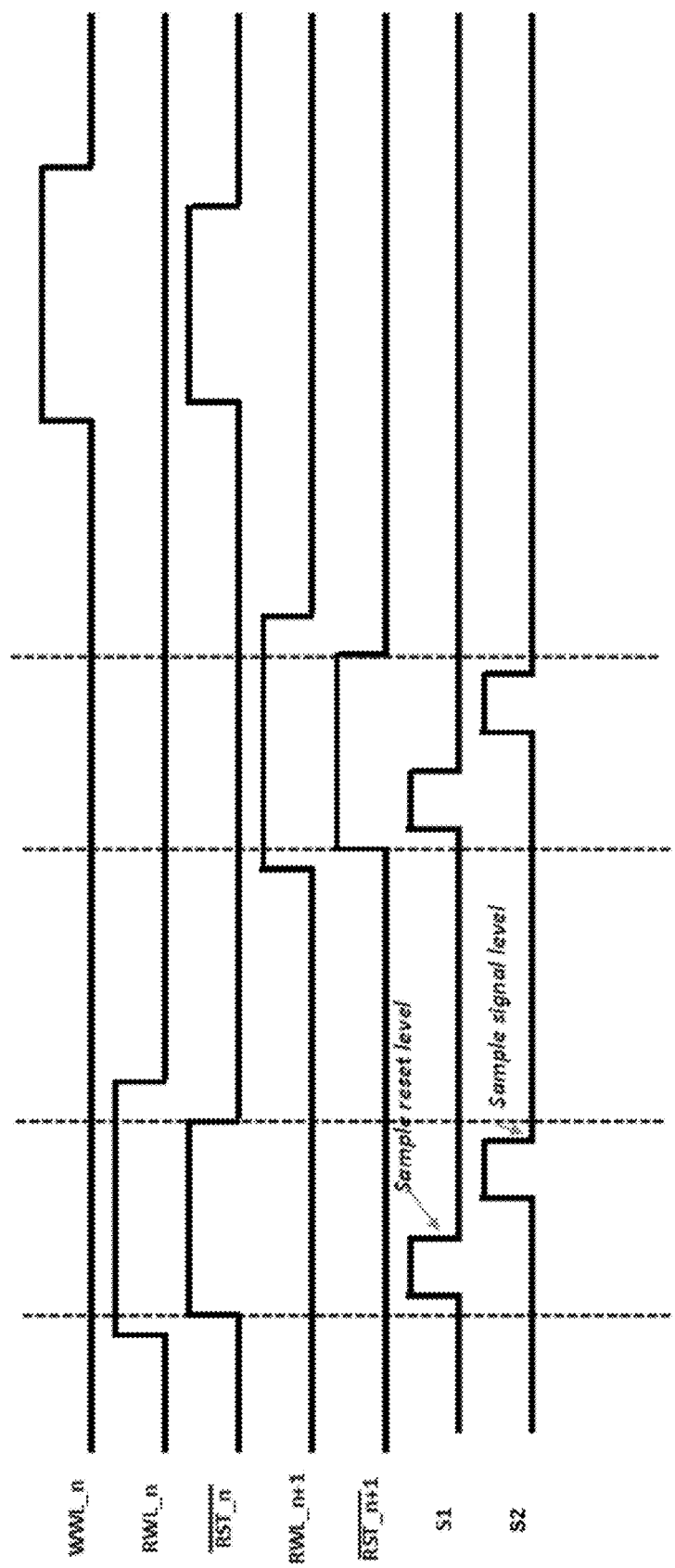
FIG. 6D illustrates a timing diagram of the cell of FIG. 5 according to aspects of the present disclosure.

FIG. 6D illustrates a timing diagram of the cell of FIG. 5 according to aspects of the present disclosure. In this example, n represents the condition of the control signals at period n; and n+1 represents the condition of the control signals at period n+1. For the light emitting operation, WWL is set to high to turn on NWWL, and /RST is set to high to turn off PRST1 and PRST2, which causes the gate of PDRW to respond to /WBL voltage. When /WBL is set to low, PDRW turns on; this causes diode D to emit light. In case of the light sensing operation, RWL is set to high to turn on NRWL, and /RST is set to high to turn off PRST2. Based on these conditions, diode D is set to a reverse bias condition. By turning on the switch $S_1$, the initial state is stored onto capacitor $CS_1$. Then, $S_1$ turns off and $S_2$ switch turns on to store the reading state onto capacitor $CS_2$.

Figure 7:
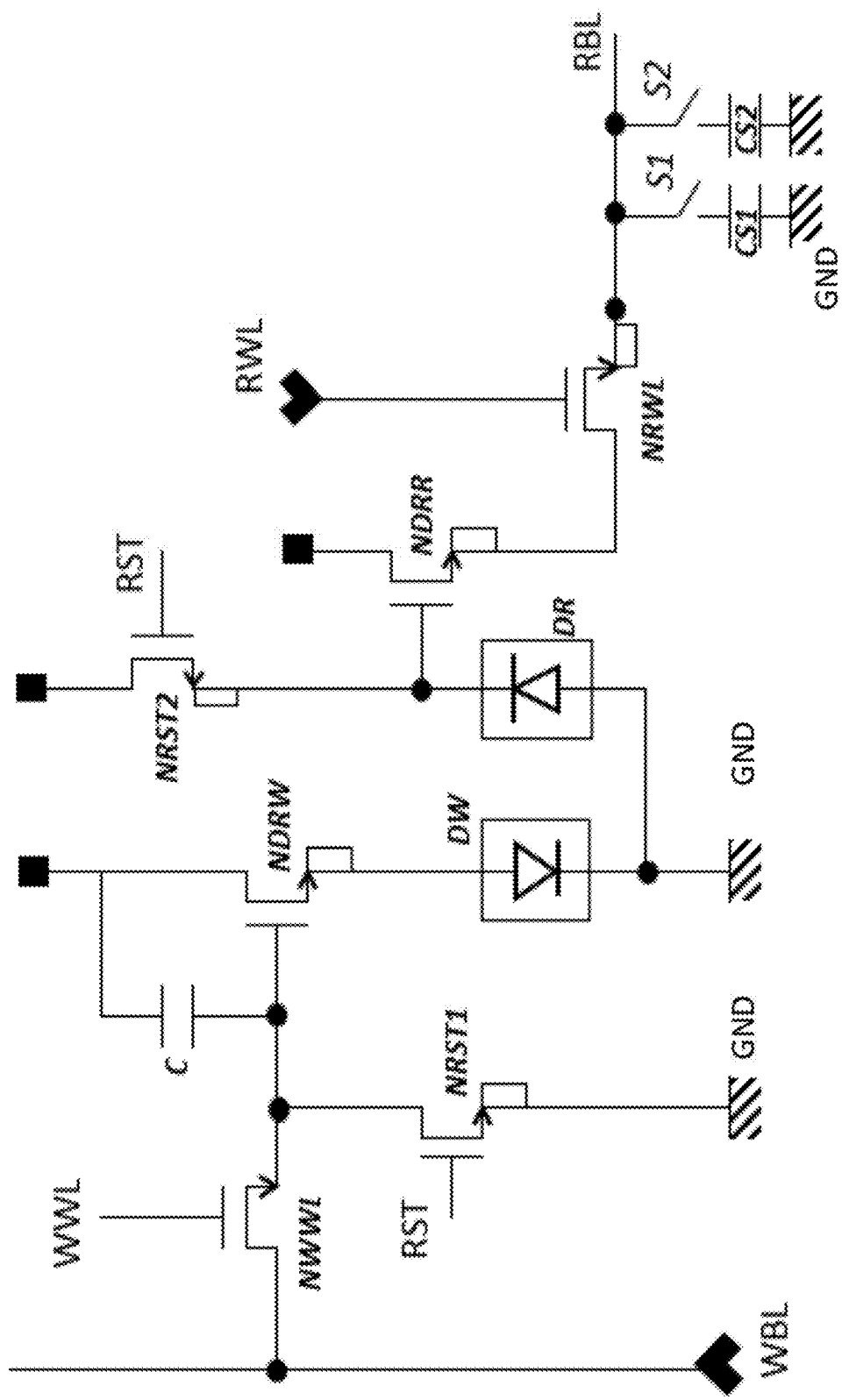
FIG. 7 illustrates another exemplary implementation of the cell of FIG. 2 using NMOS transistors according to aspects of the present disclosure.

FIG. 7 illustrates another exemplary implementation of the cell of FIG. 2 using NMOS transistors according to aspects of the present disclosure. As shown in FIG. 7, the cell includes NMOS transistors, capacitors, and two diodes. Through changing the timing of each NMOS transistor, the cell can be both be written to and/or read from. An emitting operation may be performed by sending the forwarding bias current into one the diodes, and sensing can be done by detecting the difference in voltage between the initialized state and the reading state as a result of reverse leakage current in the other diode affected by neighboring light sources.

Referring to FIG. 7, WWL represents the Write Word Line signal; WBL represents the Write Bit Line signal; RBL represents the Read Bit Line signal; RWL represents the Read Word Line signal; RST represents the Reset signal; NWWL represents the NMOS Write Word Line transistor; NRWL represents the NMOS Read Word Line transistor; NRST1 and NRST2 represent the NMOS Reset 1 transistor and NMOS Reset 2 transistor, respectively; NDRW represents the NMOS write driver transistor; NDRR represents the NMOS read driver transistor; $S_1$ and $S_2$ represent the Switch1 and the Switch 2, respectively; $CS_1$ and $CS_2$ represent Capacitor 1 and Capacitor 2, respectively.

Figure 8B:
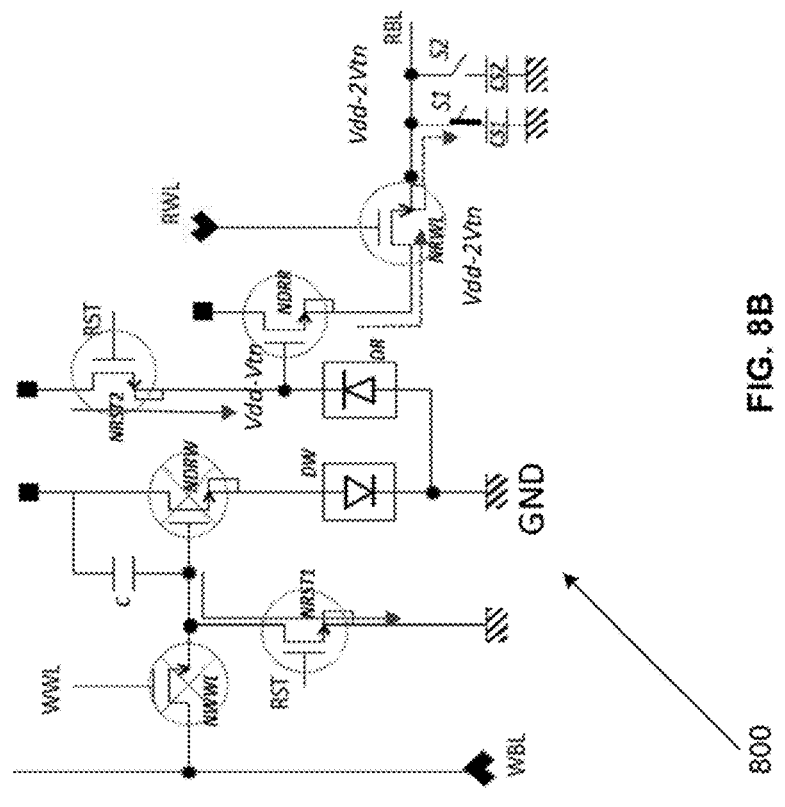
Figure 8A:
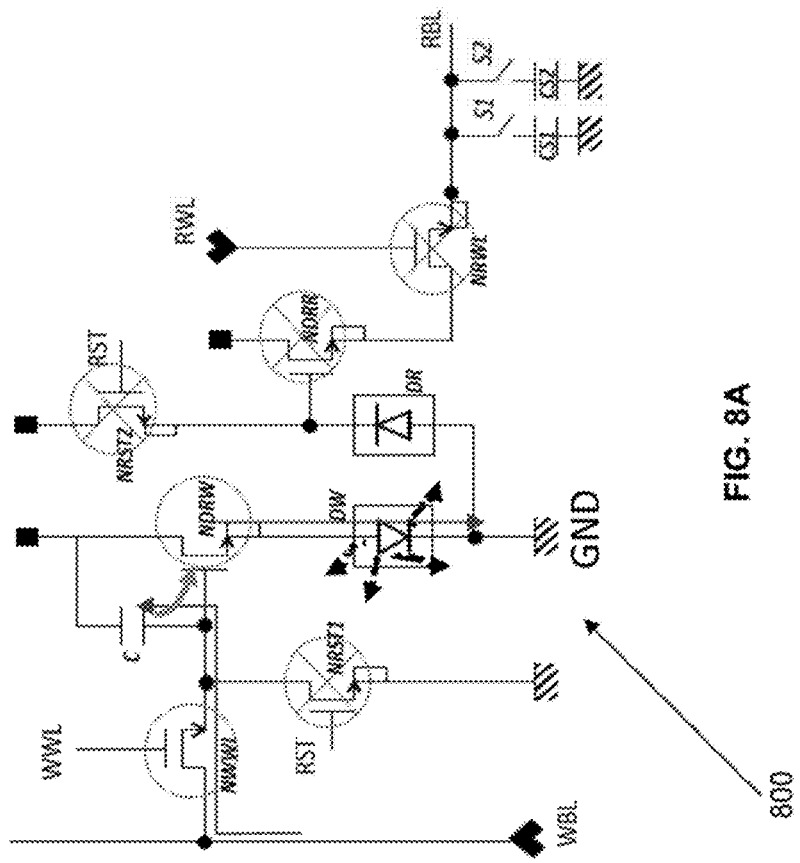

FIGS. 8A-8C illustrate emitting and sensing operations of the cell of FIG. 7 and according to aspects of the present disclosure. In the example shown in FIGS. 8A-8C, in the emitting operation, drivers attached to WBL are turned on to high before WWL (write word line) is switched to a high state. The resulting state allows current to flow from WBL across the transistor NWWL, charging the capacitor C. The length of time that WWL stays at high determines how much the capacitor C is charged. The charge on C determines the gate voltage of NDRW, which determines the current flows through diode DW into circuit ground. By this operation, the diode DW can be configured to emit light at a certain desired intensity. The source voltage for NWWL may increase to V(wwl)-Vtn. Consequently, the source voltage of NDRW may increase to VDD-2Vtn, which may be configured to be high to satisfy the forward bias condition for the diode DW.

During the emitting operation (also referred to as the write operation), the voltages at RST and RWL can be controlled to stay at low, which shut off the transistors NDRR, NRST1, NRST2, and NRWL (shown as a dotted circle enclosing a cross). The source voltage of NDRW may increase to VDD-2Vtn, which may set the diode DW into forward bias condition. FIG. 8A illustrates an example of emitting light (also referred to as light emitting operation) with the forward voltage at diode DW.

Also, the body effect of a transistor, which can affect the stability of Vtn, may need to be reduced in order to increase efficiency of the cell. Note that Vtn can be undesirably higher during operation. The LSECs bulk bias (substrate) of each NMOS transistors are connected to source terminal, which reduces the body effect.

Referring to FIG. 8B, during a sensing operation (also referred to as the read operation), the LSEC may be configured to detect light coming from adjacent cells. To set into read mode, WWL is set to low, deactivating the transistors NWWL, NDRW (shown as a dotted circle enclosing a cross).

The first step is to set the RST signal to high, activating the transistors NRST1, NRST2 and NDRR (shown as a dotted circle enclosing a cross). This sets the diode DR into the reverse bias condition to detect the initialized state sampling and isolates it from WBL. RWL may also be set to high, activating the transistors NRWL. Switch $S_1$ is turned on at the beginning of the read operation, read and stored into $CS_1$ as the initialization phase of the sensing operation, then switched off.

In the sensing phase, lights from adjacent cells creates leakage current in the diode DR that flows into circuit ground, reducing the gate voltage for NDRR, which is set to VDD-Vtn in the initialization phase. This affects the current passing through NDRR. Thus, the intensity of light be detected may control the NMOS (NDRR) current. The cell then detects signal sampling by turning on $S_2$. The light intensity may be determined by comparing the currents read in initialization phase and the sensing phase. Note that Vgs of NDRR can improve sensing current and improves the lower voltage operation. FIG. 8B illustrates an example of sensing at $S_1$ with reset condition of VDD-2Vtn. FIG. 8C illustrates an example of sensing at $S_2$ with reset condition of Vdd-2Vtn-Vr. In FIG. 8C, 802, 804, 806, and 808 are symbolic representations (without details) of cells on left, right, top, and bottom of the cell 800 shown in FIG. 8A and FIG. 8B. In this example, cells 802, 804, 806, and 808 are configured to emit light and cell 800 is configured to sense light.

Figure 9:
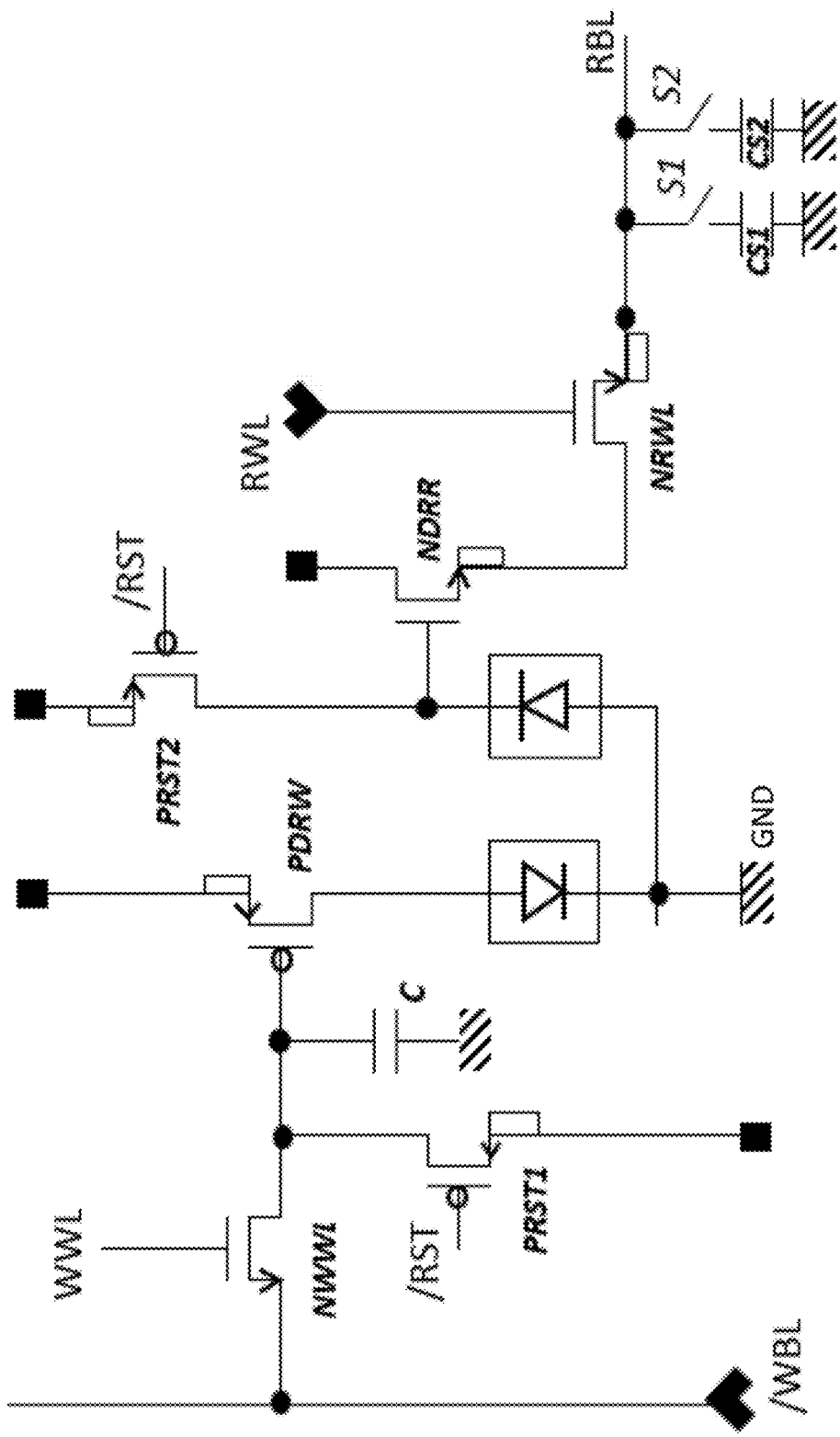
FIG. 9 illustrates another exemplary implementation of the cell of FIG. 2 using CMOS transistors according to aspects of the present disclosure.

FIG. 9 illustrates another exemplary implementation of the cell of FIG. 2 using CMOS transistors according to aspects of the present disclosure. As shown in FIG. 9, the CMOS implementation includes NMOS and PMOS transistors, capacitors, and two diodes. One of the benefits of the CMOS implementation is low power operation. In some implementations, for example, applications for OLED and LCD, a 3.3V or lower as the power supply voltage (VDD) may be used. To achieve smaller chip size and lower power, these implementations may require low power supply voltage and shrinking of the semiconductor processing technology. Through using lower power supply voltages such as 1.2V or 0.9V, the power consumption of the multi-mode display may be reduced significantly. Note that with the NMOS implementation, it may be challenging to achieve lower power supply voltage, because of the threshold voltage (Vtn). Instead, an implementation using PMOS transistors along with NMOS transistors may lower power supply voltage by about 2.1 to 2.4V.

Referring to FIG. 9, NWWL represents the Write Word Line NMOS transistor; NRWL represents the Read Word Line NMOS transistor; PDRW represents the Write Driver PMOS transistor; NDRR represents the Read Driver NMOS transistor; PRST 1 and PRST 2 represent the Reset PMOS 1 transistor and the Reset PMOS 2 transistor, respectively; DW represents the Emitting Diode; and NPD represents the Pull down NMOS transistor.

Figure 10B:
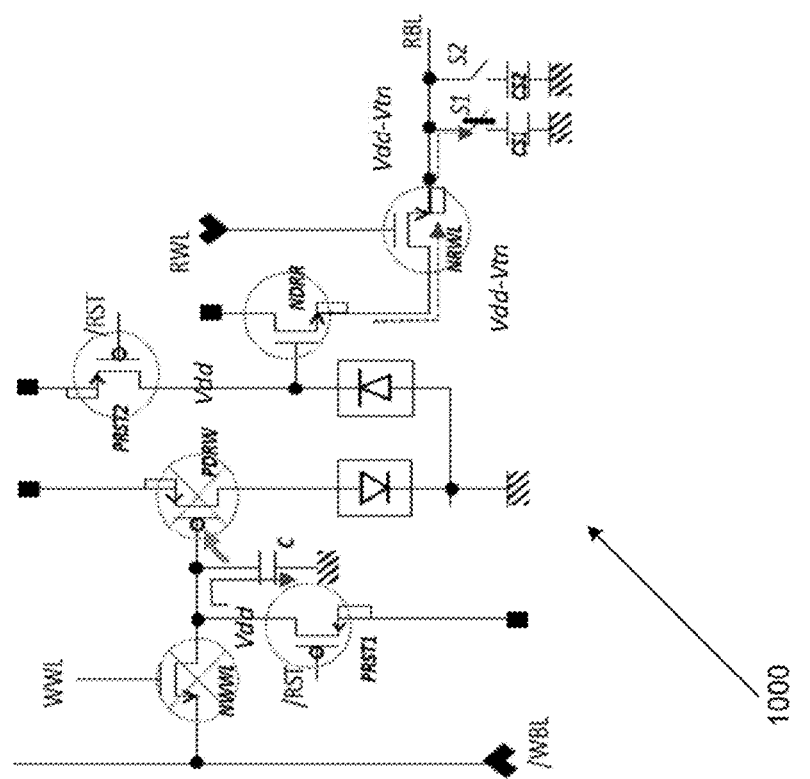
FIGS. 10A-10C illustrate emitting and sensing operations of the cell of FIG. 9 and according to aspects of the present disclosure.
Figure 10A:
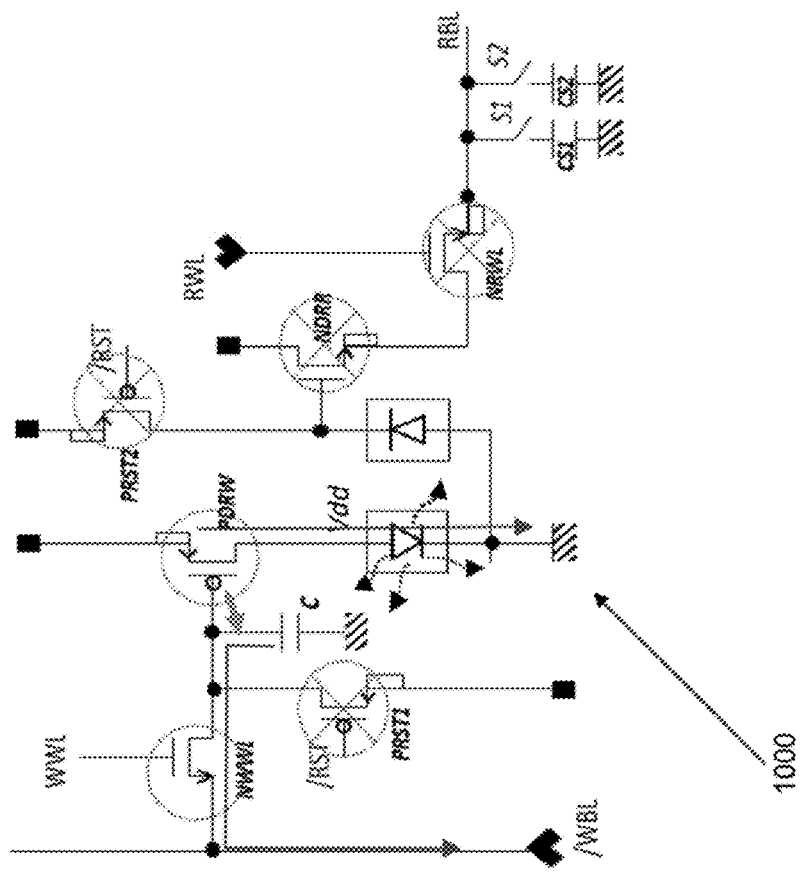
Figure 10C:
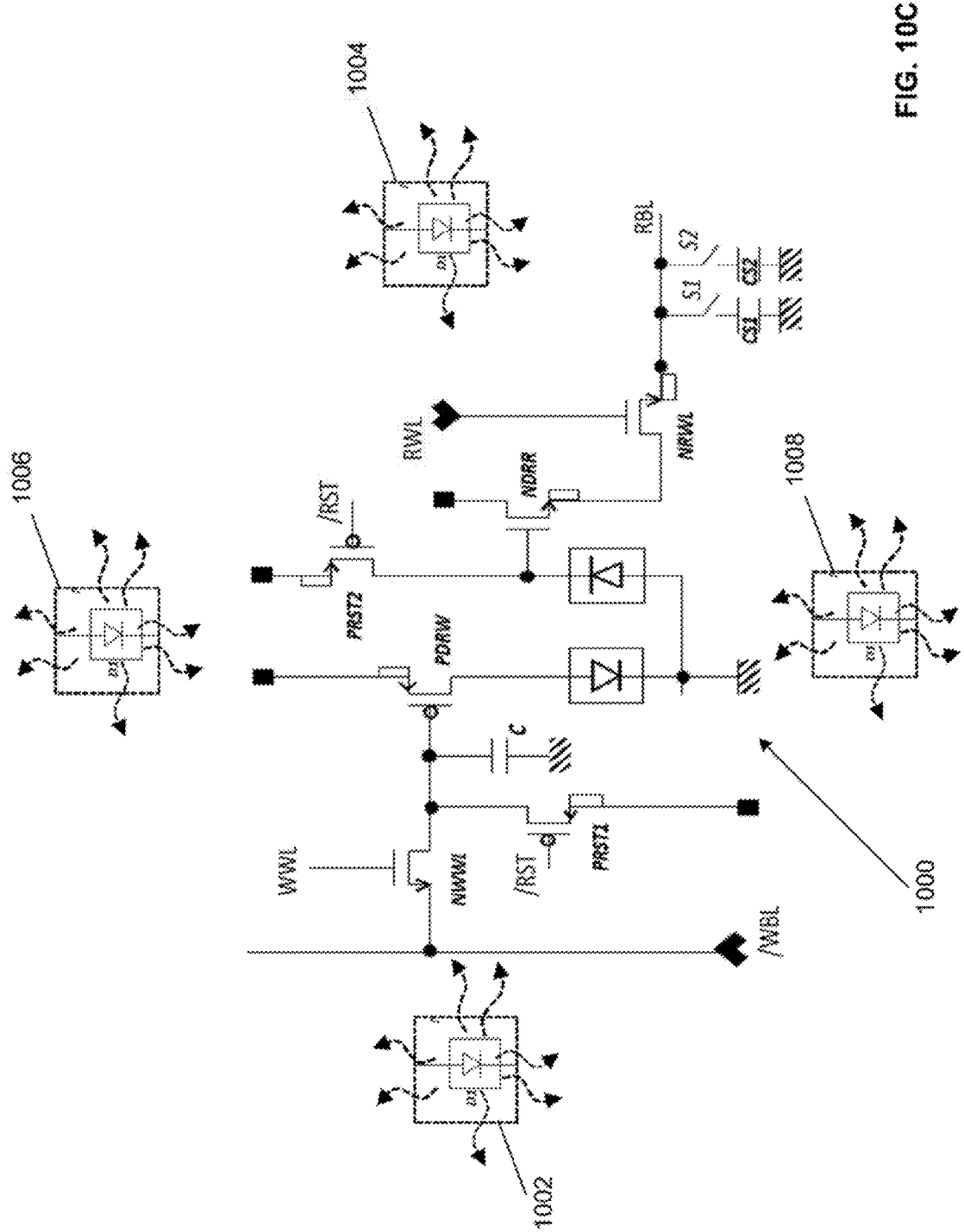

FIGS. 10A-10C illustrate emitting and sensing operations of the cell of FIG. 9 according to aspects of the present disclosure. As shown in the examples of FIGS. 10A-10C, for the emitting operation (also referred to as writing operation), by tuning on NWWL, diode DW can be configured to conduct current and to emit light. Before the emitting operation, the voltage of /WBL is pre-charged to VDD (high), and /RST is set to low to turn on PRST1 and capacitor is charged to VDD. Then WWL is set high and /WBL is set to low, which causes PDRW to turn on. When the /WBL is set to low, which turns on WWL, the charge of Capacitor is discharged to low and allowing PDRW to conduct current. FIG. 10A illustrates an example of emitting light (also referred to as a writing operation) with the forward voltage at diode DW.

By turning on PDRW, the current flows from VDD to ground through diode DW and causes it to emit light. With a NMOS implementation, there would have been a threshold voltage drop on the anode side of diode D, so that a desirable current from the diode may not be obtained. In some embodiments, threshold voltage (Vtn) may be about 0.4 to 0.7V. In contrast, the drain side of PDRW has the same voltage as VDD (Power supply voltage) without any voltage drop.

Referring to FIG. 10B, in an initialization phase of the sensing operation, /RST is set to low voltage and it turns off PDRW fully and WWL is also low. During this initialization phase, diode DW is shut off and does not affect the operation of the diode DR. During the initialization phase, the drain of PRST2 is set to high, which generates a leakage current for diode DR. The NDRR gate is controlled to be VDD and the source voltage of NDRR is controlled to be VDD-Vtn, instead of VDD-2Vtn in case of a NMOS implementation. Then RWL is set to high; and the leakage current is sampled at $CS_1$ by turning on $S_1$ switch, which is also referred to as the initialized state.

In the sensing phase of the sensing operation (also referred as the reading state), the leakage current flows through the diode DR increases and the gate voltage of NDRR drops from VDD to VDD-Vr (as the leakage current affects voltage). The leakage current is sampled at $CS_2$ by turning on the $S_2$ switch. Using this approach, an image on the multi-mode display can be detected by comparing the difference in leakage current collected between the sensing phase (reading state) and the initialization phase (initialized state) of the sensing operation.

The range for the gate voltage of NDRR is from VDD to VDD-Vr, instead of from VDD-Vtn to VDD-Vtn-Vr. With this approach, the drain voltage of PRST2 can be independent of Vtn. This is same voltage of gate of NDRR. In some embodiments, drain to source current may be proportional to square of (Vgs-Vtn). By improving the one Vtn for Vgs of NDRR improves sensing current and improves the low voltage operation. FIG. 10B illustrates an example of sensing at $S_1$ with reset condition of VDD-2Vtn. FIG. 10C illustrates an example of sensing at $S_2$ with reset condition of Vdd-2Vtn-Vr. In FIG. 10C, 1002, 1004, 1006, and 1008 are symbolic representations (without details) of cells on left, right, top, and bottom of the cell shown in FIG. 10A and FIG. 10B. In this example, cells 1002, 1004, 1006, and 1008 are configured to emit light and cell 1000 is configured to sense light.

In the examples shown in FIG. 10A-FIG. 10C, there are two diodes DW and DR. These implementations allow each diode to be optimized for emitting light and sensing light, i.e., optimizing the forwarding current in diode DW and the leakage current in diode DR independently. From the semiconductor processing point of view, with a single diode implementation, it may be more challenging to optimize the forwarding current and the leakage current in the same diode.

Figure 11A:
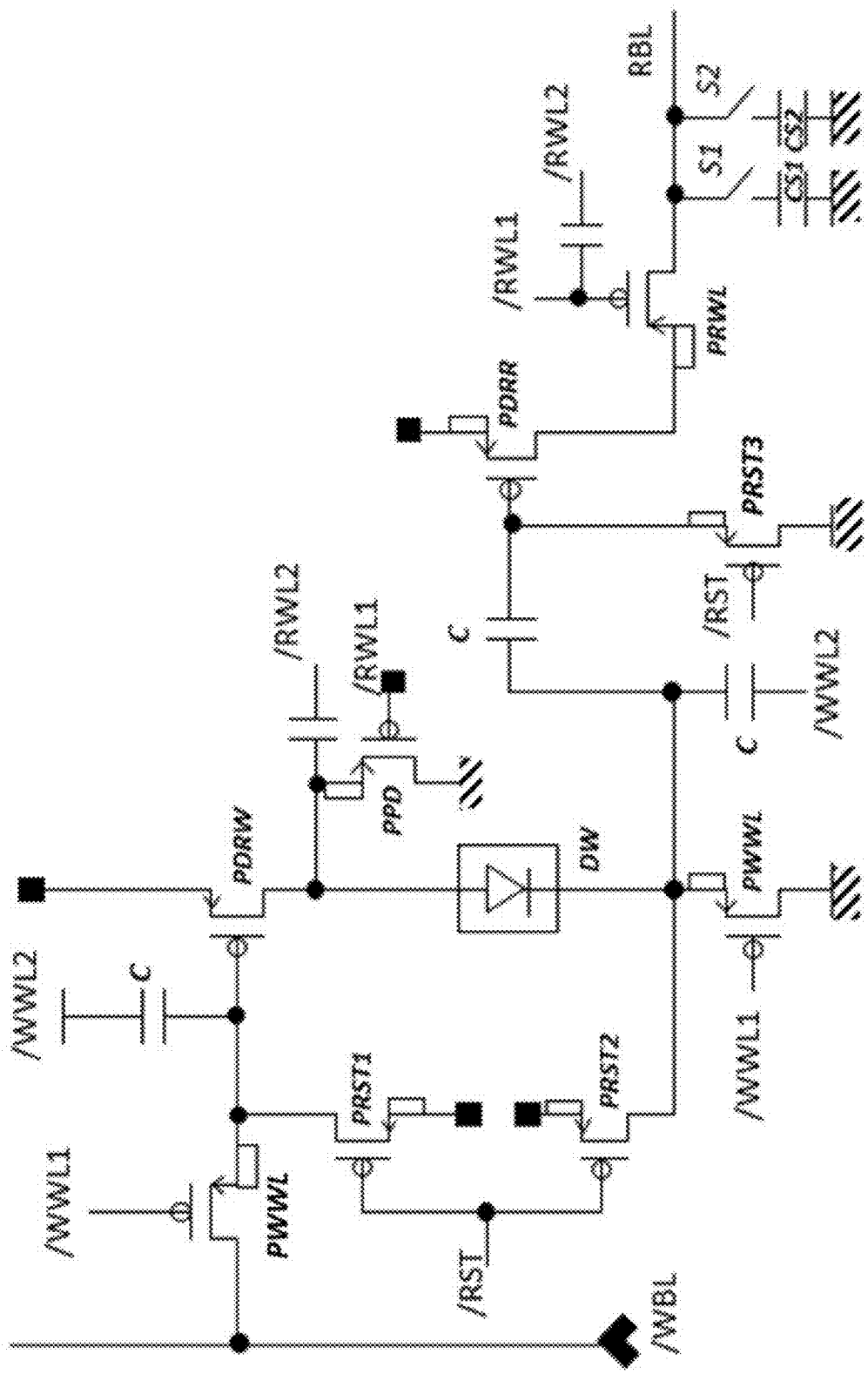
FIGS. 11A-11B illustrate exemplary implementations of the cell of FIG. 2 using PMOS transistors according to aspects of the present disclosure.
Figure 11B:
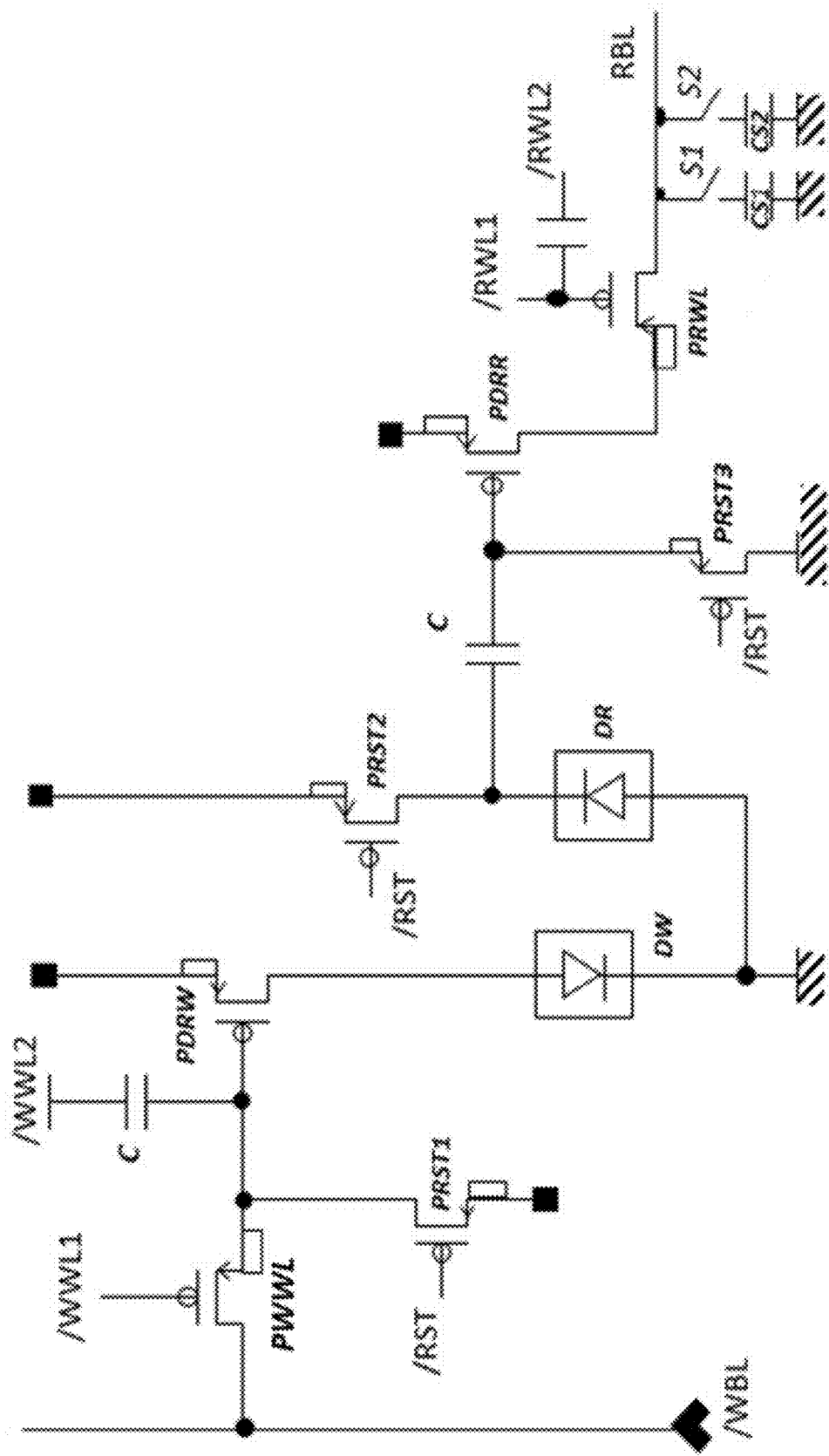

FIGS. 11A-11B illustrate exemplary implementations of the cell of FIG. 2 using PMOS transistors according to aspects of the present disclosure. In one embodiment, the PMOS implementation with two diodes cell includes PMOS transistors, Capacitors, and Diode. The benefits of PMOS implementation is high drivability operation in emitting mode and low power operation in sensing operation.

In an initialization phase of an emitting operation, by turning on PWWL, diode DW is configured to allow current to pass through, which in turn causes the diode DW to emit light. The voltage of /WBL is pre-charged to VDD (high). Then, /WWL1 is set to low and /WBL, which is driven by the write driver, is set to low as well. As a result, the /RST signal is high, which turns off PRST1. When the write driver drives /WBL to low and turns on /WWL1, the charges stored in Capacitor C is discharged to low, which stays as the PMOS threshold voltage. Then, /WWL2, which has a delayed timing compared to /WWL1, is changed from high to low, bringing down the gate voltage of PDRW to negative voltage through capacitor. This increases the gate to source voltage of PDRW, which in turn produces a higher driving current to diode DW.

In an emitting phase of the light emitting operation (also referred to as the writing state), by turning on PDRW, the current flows from VDD to circuit ground through the diode DW, which cause diode DW to emit light. Note that with this approach, there is no voltage drop on the drain of PDRW. Comparing to a NMOS implementation, there can be a threshold voltage drop on the anode side of the diode DW, meaning the current flows through diode DW is not maximized. The threshold voltage (Vtn) in the NMOS implementation can be between 0.4-0.7V. In the PMOS implementation, the drain side of PDRW has the same voltage as VDD, the power supply voltage, without any drop voltage.

Referring to FIG. 11B, in an initialization phase of the sensing operation, /RST has low voltage, turning off PDRW fully. /WWL1 and /WWL2 are also high. During the initialization phase, the diode DW is shut off and does not affect the operation of the diode DR. The drain of PRST2 is set to high, which generates maximum leakage current for the diode DR. The PDRR gate is controlled to be |Vtp| by PRST3.

/RWL1 is set to low and then /RWL2 is set to low, which is delayed in timing to switch after /RWL1, is changed from high to low. The current from PDRR and PRWL is sampled at $CS_1$ by turning on the switch $S_1$ (which is also referred to as the initialized state). The amount of the current may be proportional to (VDD-2|Vtp|)2 in the initialization phase of the sensing operation.

In the sensing phase of the light sensing operation, the leakage current of the diode DR increases and the gate voltage of PDRR drops from |Vtp| to |Vtp|-Vr (as the leakage current affects voltage). The state is sampled at $CS_2$ by turning on the switch $S_2$ (which is also referred to as the reading state). Using this approach, an image on the multi-mode display can be detected by comparing the reading state to the initialized state. The range for the gate voltage of PDRR is from |Vtp| to |Vtp|-Vr depending on brightness of the incoming light.

According to aspects of the present disclosure, a PMOS implementation with one diode cell may include PMOS transistors, Capacitors, and Diode. The benefits of the PMOS implementation is high drivability operation in emitting mode and low power operation in sensing operation.

In an initialization phase of the light emitting operation, by turning on PWWL, DW is ready to flow current and emit light. The voltage of /WBL is pre-charged to VDD (high). Then, /WWL1 is set low and /WBL, which is driven by the write driver, is set to low as well. /RST is set to high, which turns off PRST1. When the write driver drives /WBL to low and turns on /WWL1, the charge of capacitor C is discharged to low, which stays as the PMOS threshold voltage. Then, /WWL2, which has a delayed timing compared to /WWL1, is changed from high to low, bringing down the gate voltage of PDRW to negative voltage through capacitor. This can increase the gate to source voltage of PDRW, which causes strong driving current to diode DW.

In an emitting phase of the light emitting operation (also referred to as the writing state), by turning on PDRW, the current flows from VDD to circuit ground through the diode DW, and this causes the diode DW to emit light.

There is no substantial voltage drop on the drain of PDRW. In contrast, in the NMOS implementation, there was a threshold voltage drop on the anode side of the diode DW, meaning the current flows through diode DW is not maximized. The threshold voltage (Vtn) in the NMOS implementation can be between 0.4-0.7V. In the PMOS implementation, the drain side of PDRW has the same voltage as VDD, the power supply voltage, without any substantial voltage drop.

Referring to FIG. 11B, in an initialization phase of the sensing operation, /RST is set to low, turning off PDRW fully. /WWL1 and /WWL2 are set to high. In this initialization phase, the diode DW is in the reverse mode and is configured to sense light. The drain of PRST2 is set to high, which generates a condition for maximum leakage current detection for the diode DW. The PDRR gate is controlled to be IVtpl by PRST3.

Then, /RWL1 is set to low and then /RWL2, which is delayed in timing to switch after /RWL1 is changed from high to low. It makes the anode voltage of DW negative, which sets DW to a condition for maximizing the leakage current. The current from PDRR and PRWL is sampled at $CS_1$ by turning on the switch $S_1$ (which is also referred to as the initialized state). Note that in this exemplary implementation, the amount of the current may be proportional to (VDD-2|Vtp|)2 in the initialization phase of the sensing operation.

In the sensing phase of the light sensing operation, the leakage current of the diode DW increases and the gate voltage of PDRR drops from |Vtp| to |Vtp|-Vr (Leakage current affects voltage). The state may then be sampled at $CS_2$ by turning on the switch $S_2$ (which is also referred to as the reading state). In this manner, an image on the multi-mode display can be detected by comparing the reading state to the initialized state. The range for the gate voltage of PDRR is from |Vtp| to |Vtp|-Vr depending on brightness of the incoming light.

Figure 12:
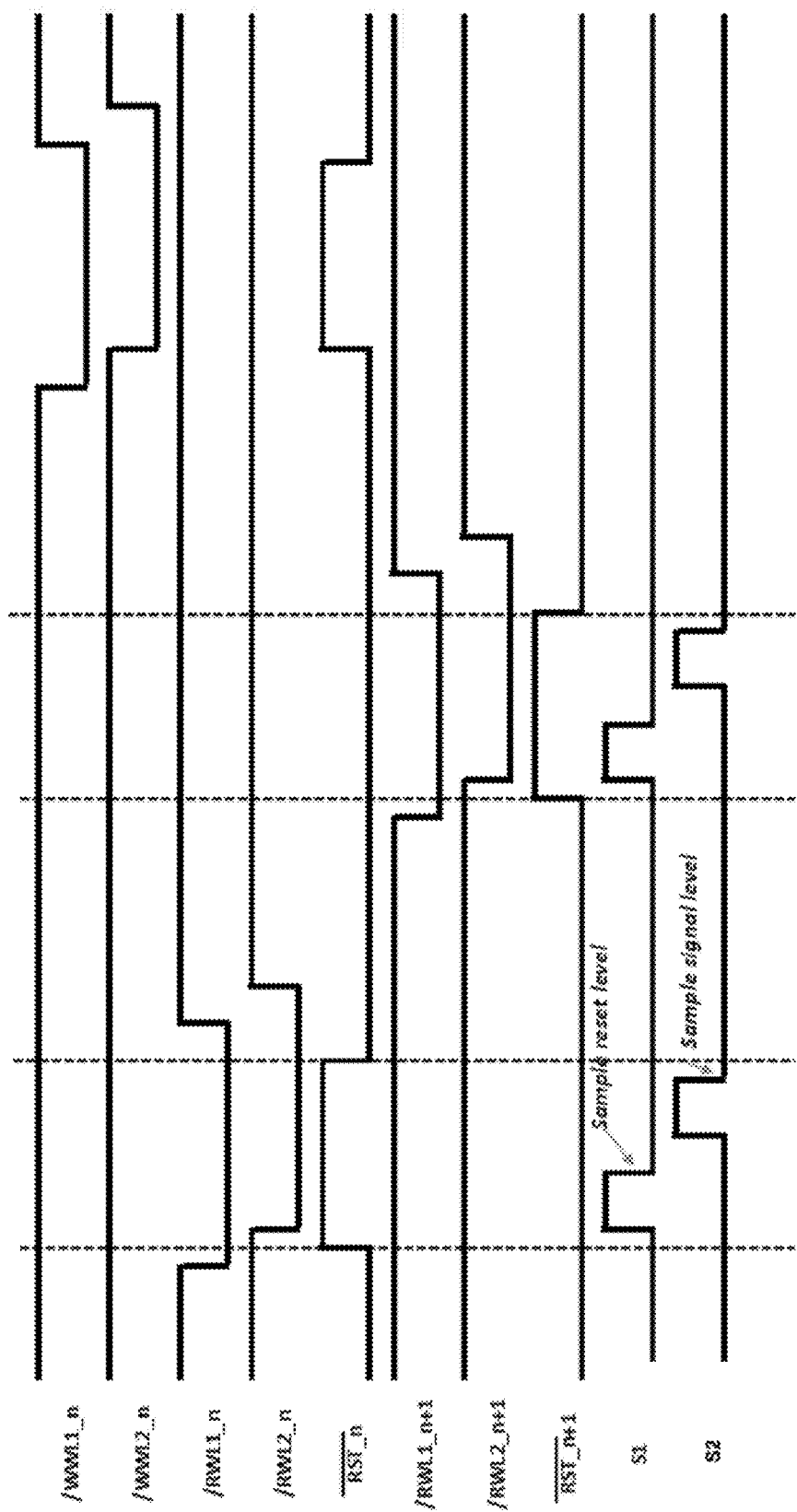
FIG. 12 illustrates a timing diagram of the cell of FIG. 11A according to aspects of the present disclosure.

FIG. 12 illustrates a timing diagram of the cell of FIG. 11A according to aspects of the present disclosure. In this example, n represents the condition of the control signals at period n; and n+1 represents the condition of the control signals at period n+1. For the light emitting operation, /WWL1 is set to low to turn on PWWL, and /RST is set to high to turn off PRST1 in the one diode case, or both PRST1 and PRST2 in the two diode case, which causes the gate voltage of PDRW respond to /WBL voltage. When /WBL is set to low, PDRW turns on. Then /WWL2 is set to low to increase the gate voltage of PDRW, which turns on PDRW; this results in a higher forward current, and increases light intensity emitted by diode DW. In case of the light sensing operation, /RWL1 is set to low to turn on PRWL, and /RST is set to high to turn off PRST3. Then /RWL2 is set to low to increase the gate voltage of PRWL, which turns on PRWL with more current for a faster response time. Based on these conditions, diode DW is set to a reverse bias condition. By turning on the switch $S_1$, the initial state is stored onto capacitor $CS_1$. Then, $S_1$ turns off and $S_2$ switch turns on to store the reading state onto capacitor $CS_2$.

Figure 13:
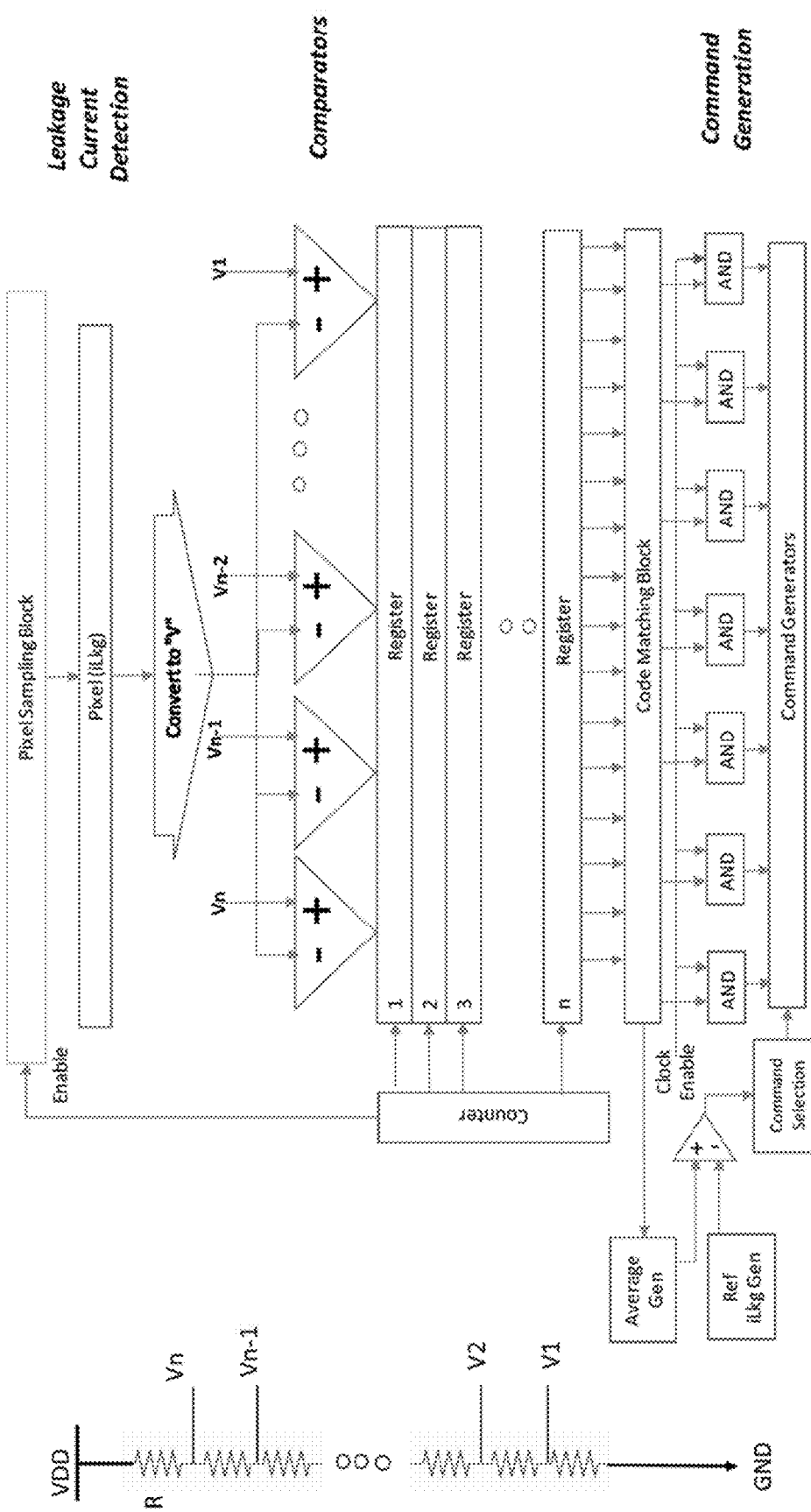
FIG. 13 illustrates an exemplary circuit for detecting a leakage current corresponding to changes of light conditions on a display according to aspects of the present disclosure.

FIG. 13 illustrates an exemplary circuit for detecting a leakage current corresponding to changes of light conditions on a display according to aspects of the present disclosure. In FIG. 13, an exemplary control circuit for determining whether an object or finger is hovering or touching the panel and its corresponding position is shown. According to aspects of the present disclosure, the control circuit can be configured to compare the leakage currents of each position in the matrix of sensors to a reference. Based on reference leakage currents that come from experimental data, the controller can determine the difference between hovering and touching modes on the screen. Reference leakage voltage for hovering can be smaller than the minimum leakage voltage of touching mode. Each comparator detects the pixels' leakage currents, which is converted to voltage and compared to a resistor divider voltage generator. It generates a command which represents the action on the screen. In some implementations, a set of user defined commands may be generated and stored in a database or memory of the multi-mode display. If output data from comparators match one of the existing commands in the memory, it selects the corresponding action from the controller through the command generator. The output of command generator selects one of the expected actions. In one exemplary implementation, the processing can be synchronized using a synchronization clock.

Figure 14C:
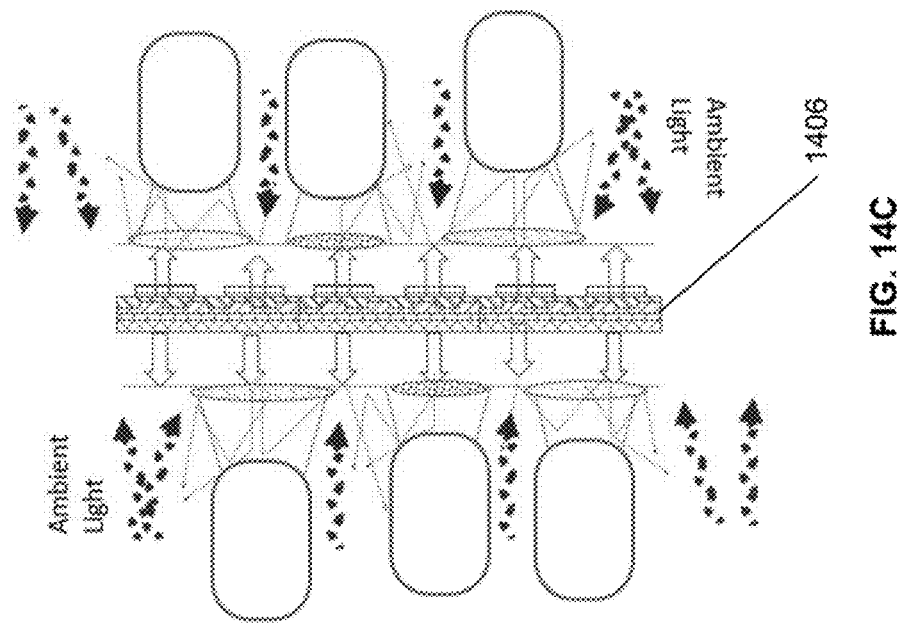
FIGS. 14A-14C illustrate examples of OLEDs with light sensors for detecting a leakage current corresponding to changes of light conditions according to aspects of the present disclosure.
Figure 14A:
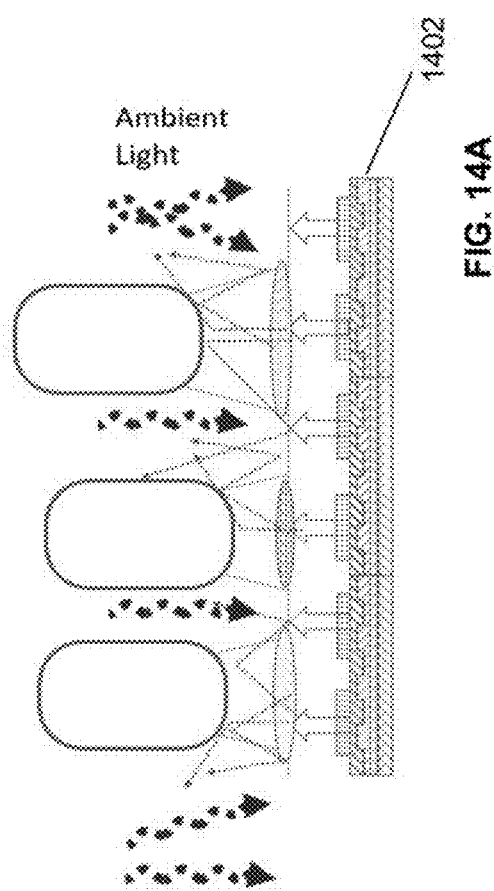
Figure 14B:
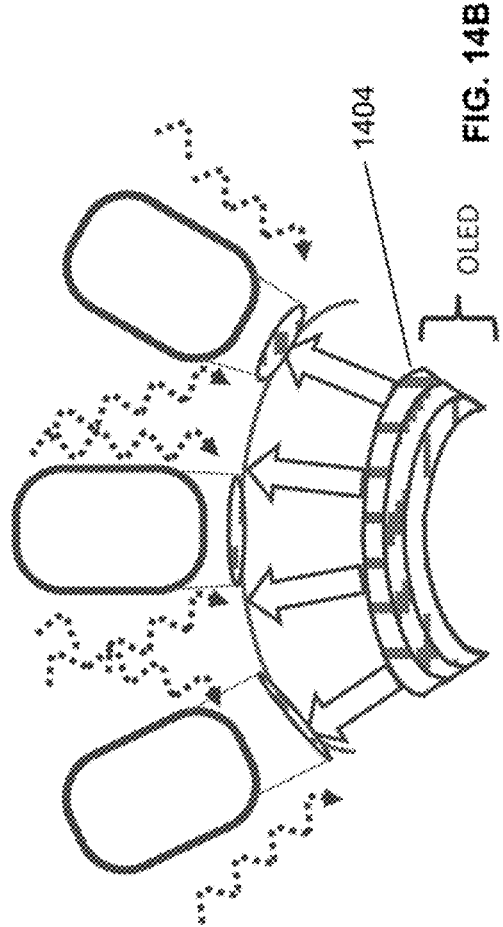

FIGS. 14A-14C illustrate examples of OLEDs with light sensors for detecting a leakage current corresponding to changes of light conditions according to aspects of the present disclosure. FIG. 14A illustrates a unidirectional OLED with light sensors; FIG. 14B illustrates a conformable OLED with light sensors; and FIG. 14C illustrates a bi-directional OLED with light sensors according to aspects of the present disclosure.

According to aspects of the present disclosure, both top emission and bottom emission type OLED structures can be used as the main component of a fingerprint acquisition apparatus. Several different types of OLED devices, such as small molecule OLED, polymer OLED, or solution based OLED, may be utilized as main OLED device structures. Both transparent and non-transparent OLED panels can be used as the main component of a fingerprint acquisition apparatus. Both thin panel and flexible or conformable types of OLED panels can be used as the main component of a fingerprint acquisition apparatus.

An active matrix OLED (AMOLED) panel can be used as the main component of a fingerprint acquisition apparatus. An AMOLED panel may include subpixel areas (red, green, and blue subpixels) and a driving circuit area (thin film transistor and capacitor). The brightness of each subpixel can be adjusted by the driving and switching transistors and capacitors and by controlling the amount of current injected to the OLED subpixels. The dimension of subpixels can be formed using OLED material deposition techniques. For instance, the size and position of subpixels can be set by using shadow masks during the OLED material evaporation process.

An OLED may have a layered structure with the following sequence: anode/hole injection layer/hole transport layer/emissive layer/electron transport layer/electron injection layer/cathode. ITO and other transparent conducting materials having high work function can be used for anode materials, and metals such as aluminum and magnesium can be used for cathode materials. In some implementations, the imaging surface may be at the bottom of the substrate, and the light emission plane may be the cathode layer. The optical structure may include the transparent layers between the substrate and the cathode.

Figure 15A:
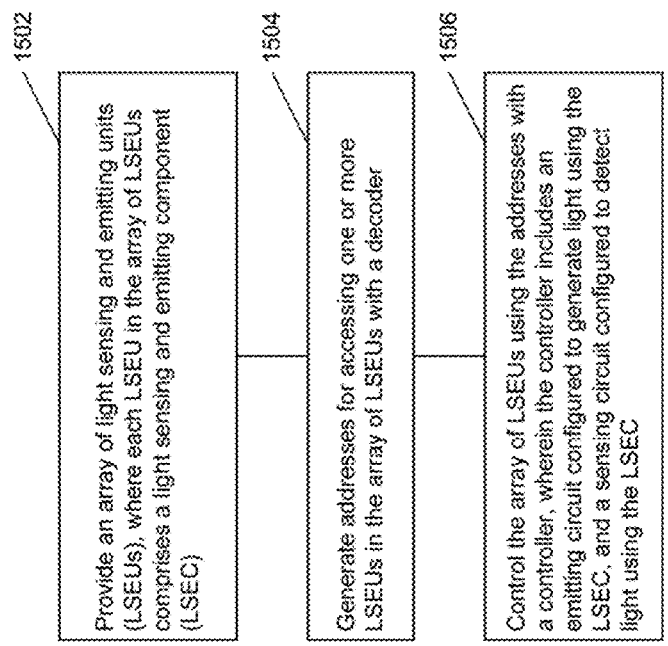
FIGS. 15A-15C illustrate an exemplary method for controlling a multi-mode display according to aspects of the present disclosure.

FIG. 15A illustrate an exemplary method for controlling a multi-mode display according to aspects of the present disclosure. In the example shown in FIG. 15A, in block 1502, the method provides an array of light sensing and emitting units (LSEUs), wherein each LSEU in the array of LSEUs comprises a light sensing and emitting component (LSEC). In block 1504, the method generates addresses for accessing one or more LSEUs in the array of LSEUs with a decoder. In block 1506, the method control the array of LSEUs using the addresses with a controller, where the controller includes an emitting circuit configured to generate light using the LSEC, and a sensing circuit configured to detect light using the LSEC.

Figure 15B:
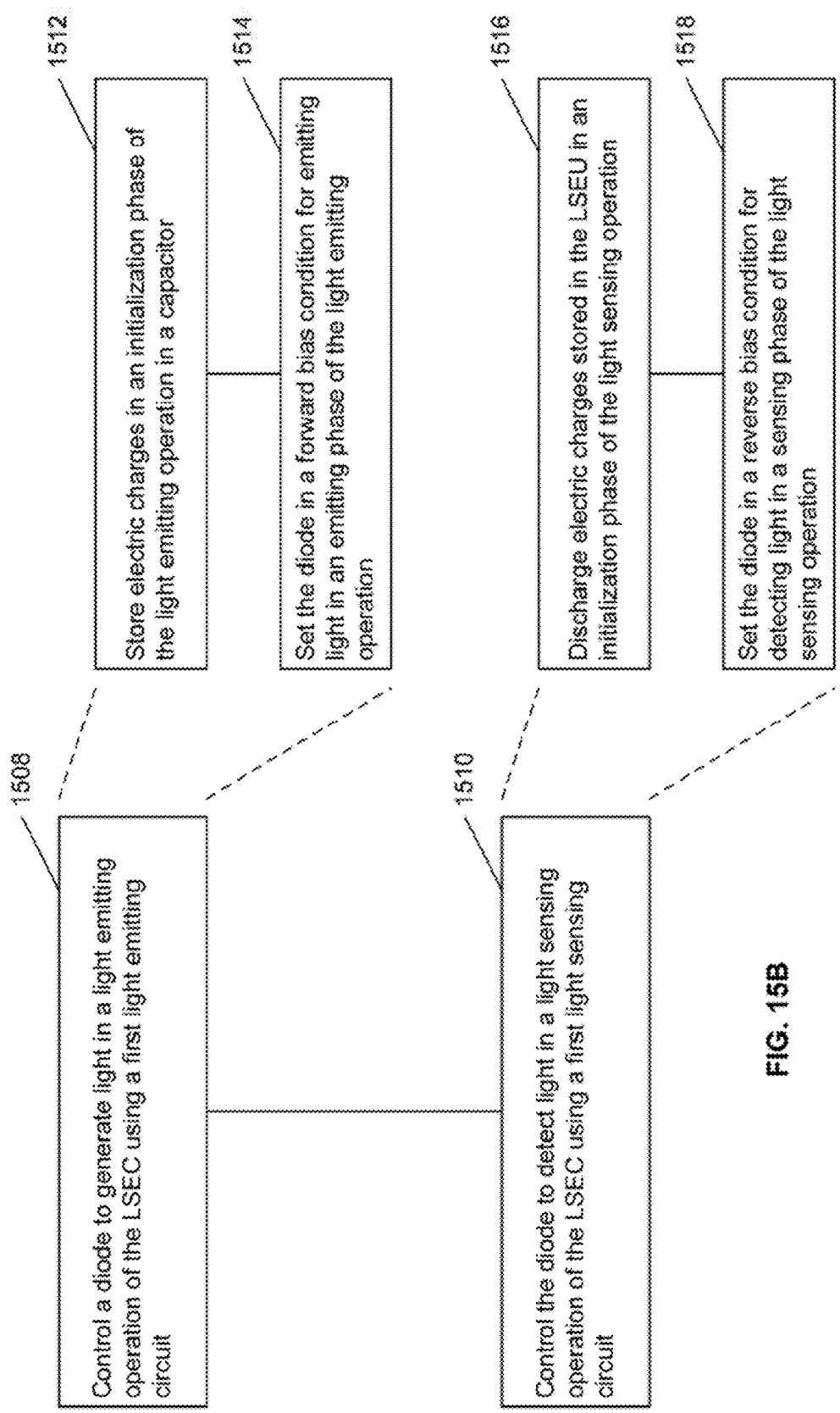

FIG. 15B illustrate an exemplary implementation for controlling the array of LSEUs according to aspects of the present disclosure. As shown in FIG. 15B, for each LSEU in the array of LSEUs, in block 1508, the controller controls a diode to generate light in a light emitting operation of the LSEC using a first light emitting circuit; and in block 1510, the controller controls the diode to detect light in a light sensing operation of the LSEC using a first light sensing circuit.

According to aspects of the present disclosure, the method described in block 1508 may further include the methods described in block 1512 and block 1514. The method described in block 1510 may further include the methods described in block 1516 and block 1518. In block 1512, the controller is configured to store electric charges in an initialization phase of the light emitting operation in a capacitor. In block 1514, the controller is configured to set the diode in a forward bias condition for emitting light in an emitting phase of the light emitting operation. In block 1516, the controller is configured to discharge electric charges stored in the LSEU in an initialization phase of the light sensing operation. In block 1518, the controller is configured to set the diode in a reverse bias condition for detecting light in a sensing phase of the light sensing operation.

Figure 15C:
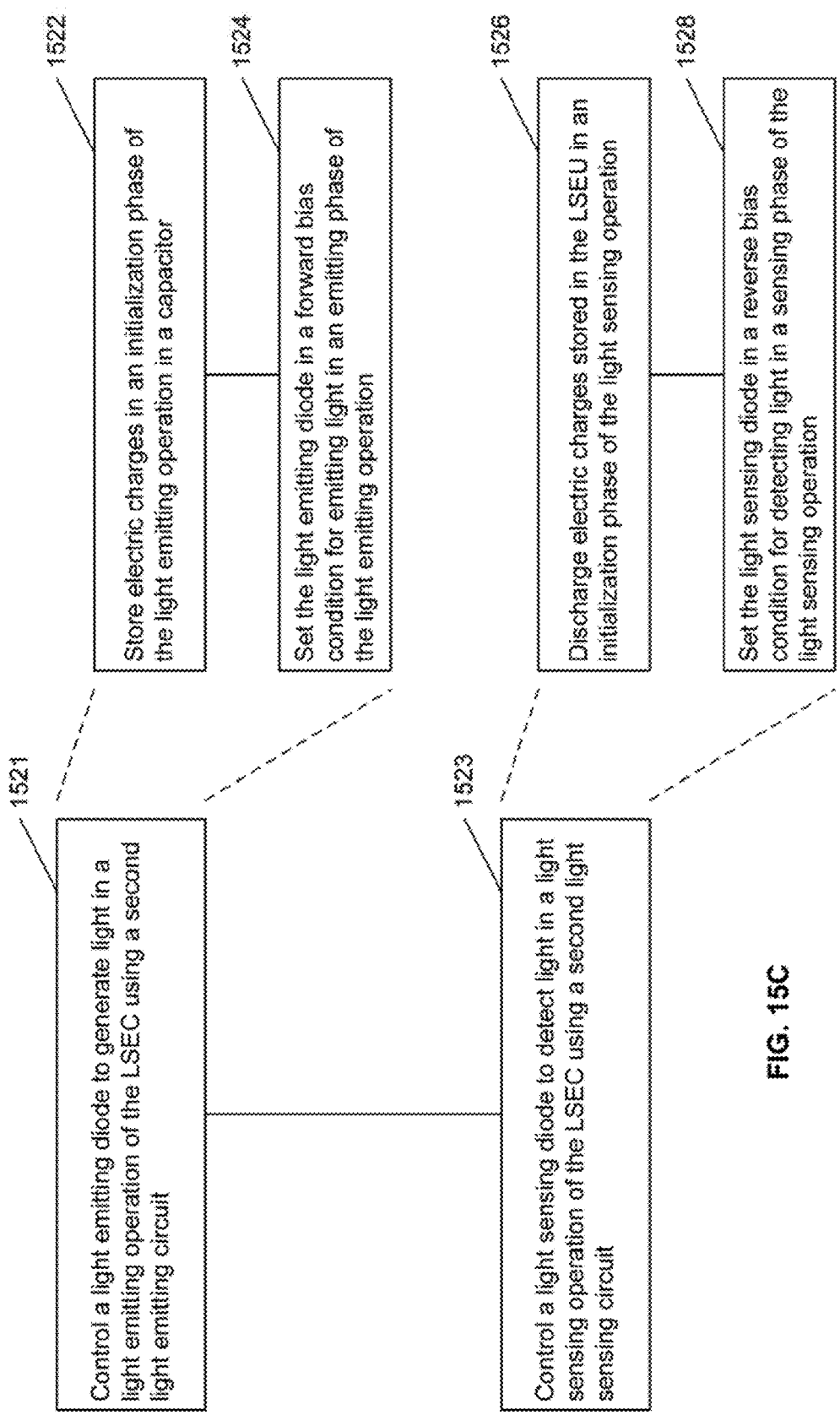

FIG. 15C illustrate an exemplary implementation for controlling the array of LSEUs according to aspects of the present disclosure. As shown in FIG. 15C, for each LSEU in the array of LSEUs, in block 1521, the controller controls a light emitting diode to generate light in a light emitting operation of the LSEC using a second light emitting circuit; and in block 1523, the controller controls a light sensing diode to detect light in a light sensing operation of the LSEC using a second light sensing circuit.

According to aspects of the present disclosure, the method described in block 1521 may further include the methods described in block 1522 and block 1524. The method described in block 1523 may further include the methods described in block 1526 and block 1528. In block 1522, the controller is configured to store electric charges in an initialization phase of the light emitting operation in a capacitor. In block 1524, the controller is configured to set the light emitting diode in a forward bias condition for emitting light in an emitting phase of the light emitting operation. In block 1526, the controller is configured to discharge electric charges stored in the LSEU in an initialization phase of the light sensing operation. In block 1528, the controller is configured to set the light sensing diode in a reverse bias condition for detecting light in a sensing phase of the light sensing operation.

According to aspects of the present disclosure, a mobile device is usually equipped with a touch sensor. If a mobile device was equipped with the multi-mode display of the present disclosure, then the touch sensor would not be required, as the multi-mode may also be used as a touch sensor. As described herein, a mobile device can be configured to include a multi-mode display for fingerprint recognition. In some implementations, the mobile device may comprise a wireless transceiver which is capable of transmitting and receiving wireless signals via wireless antenna over a wireless communication network. Wireless transceiver may be connected to a bus by a wireless transceiver bus interface. The wireless transceiver bus interface may, in some embodiments be at least partially integrated with wireless transceiver. Some embodiments may include multiple wireless transceivers and wireless antennas to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

The mobile device may also comprise a SPS receiver capable of receiving and acquiring SPS signals via a SPS antenna. The SPS receiver may also process, in whole or in part, acquired SPS signals for estimating a location of the mobile device. In some embodiments, processor(s), memory, DSP(s) and/or specialized processors (not shown) may also be utilized to process acquired SPS signals, in whole or in part, and/or calculate an estimated location of the mobile device, in conjunction with the SPS receiver. Storage of SPS or other signals for use in performing positioning operations may be performed in memory or registers (not shown).

In addition, the mobile device may comprise digital signal processor(s) (DSP(s)) connected to the bus by a bus interface, processor(s) connected to the bus by a bus interface and memory. The bus interface may be integrated with the DSP(s), processor(s) and memory. In various embodiments, functions may be performed in response execution of one or more machine-readable instructions stored in memory such as on a computer-readable storage medium, such as RAM, ROM, FLASH, or disc drive, just to name a few example. The one or more instructions may be executable by processor(s), specialized processors, or DSP(s). The memory may comprise a non-transitory processor-readable memory and/or a computer-readable memory that stores software code (programming code, instructions, etc.) that are executable by processor(s) and/or DSP(s) to perform functions described herein. In a particular implementation, the wireless transceiver may communicate with processor(s) and/or DSP(s) through the bus to enable the mobile device to be configured as a wireless station as discussed above. Processor(s) and/or DSP(s) may execute instructions to execute one or more aspects of processes/methods discussed herein.

According to aspects of the present disclosure, a user interface may comprise any one of several devices such as, for example, a speaker, microphone, display device, vibration device, keyboard, touch screen, etc. In a particular implementation, the user interface may enable a user to interact with one or more applications hosted on the mobile device. For example, devices of user interface may store analog or digital signals on the memory to be further processed by DSP(s) or processor in response to action from a user. Similarly, applications hosted on the mobile device may store analog or digital signals on the memory to present an output signal to a user. In another implementation, the mobile device may optionally include a dedicated audio input/output (I/O) device comprising, for example, a dedicated speaker, microphone, digital to analog circuitry, analog to digital circuitry, amplifiers and/or gain control. In another implementation, the mobile device may comprise touch sensors responsive to touching or pressure on a keyboard or touch screen device.

The mobile device may also comprise a dedicated camera device for capturing still or moving imagery. The dedicated camera device may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at the processor(s) or DSP(s). Alternatively, a dedicated video processor may perform conditioning, encoding, compression or manipulation of signals representing captured images. Additionally, the dedicated video processor may decode/decompress stored image data for presentation on a display device on the mobile device.

The mobile device may also comprise sensors coupled to the bus which may include, for example, inertial sensors and environment sensors. Inertial sensors may comprise, for example accelerometers (e.g., collectively responding to acceleration of the mobile device in three dimensions), one or more gyroscopes or one or more magnetometers (e.g., to support one or more compass applications). Environment sensors of the mobile device may comprise, for example, temperature sensors, barometric pressure sensors, ambient light sensors, and camera imagers, microphones, just to name few examples. The sensors may generate analog or digital signals that may be stored in memory and processed by DPS(s) or processor(s) in support of one or more applications such as, for example, applications directed to positioning or navigation operations.

In a particular implementation, the mobile device may comprise a dedicated modem processor capable of performing baseband processing of signals received and down-converted at a wireless transceiver or SPS receiver. Similarly, the dedicated modem processor may perform baseband processing of signals to be up-converted for transmission by the wireless transceiver. In alternative implementations, instead of having a dedicated modem processor, baseband processing may be performed by a processor or DSP (e.g., processor(s) or DSP(s)).

Note that at least FIG. 1B-1C, FIG. 2A-2B, FIG. 4A-4C, FIG. 5, FIG. 6A-6C, FIG. 7, FIG. 8A-8C, FIG. 9, FIG. 10A-10C, FIG. 11A-11B, FIG. 13, FIG. 15A-15C and their corresponding descriptions provide means for generating addresses for accessing one or more LSEUs in the array of LSEUs; means for controlling the array of LSEUs using the addresses, where the controller includes an emitting circuit configured to generate light using the LSEC, and a sensing circuit configured to detect light using the LSEC; means for controlling a diode to generate light in a light emitting operation of the LSEC; means for controlling the diode to detect light in a light sensing operation of the LSEC; means for storing electric charges in an initialization phase of the light emitting operation; means for setting the diode in a forward bias condition for emitting light in an emitting phase of the light emitting operation; means for discharging electric charges stored in the LSEU in an initialization phase of the light sensing operation; means for setting the diode in a reverse bias condition for detecting light in a sensing phase of the light sensing operation; means for controlling a light emitting diode to generate light in a light emitting operation of the LSEC; means for controlling a light sensing diode to detect light in a light sensing operation of the LSEC; means for storing electric charges in an initialization phase of the light emitting operation; means for setting the light emitting diode in a forward bias condition for emitting light in an emitting phase of the light emitting operation; means for discharging electric charges stored in the LSEU in an initialization phase of the light sensing operation; and means for setting the light sensing diode in a reverse bias condition for detecting light in a sensing phase of the light sensing operation.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A multi-mode display, comprising:
   an array of light sensing and emitting units (LSEUs);
   a decoder configured to generate addresses for accessing one or more LSEUs in the array of LSEUs; and
   a controller configured to control the array of LSEUs using the addresses,
   wherein each LSEU in the array of LSEUs comprises a light sensing and emitting component (LSEC), an emitting circuit configured to generate light using the LSEC, and a sensing circuit configured to detect light using the LSEC, wherein the sensing circuit includes a read driver, wherein a gate terminal of the read driver is directly connected to a diode in the LSEC and a cathode terminal of the diode is directly connected to a power source through a drain terminal of a pull up transistor and a source terminal of the pull up transistor is directly connected to the power source, wherein an anode terminal of the diode is directly connected to a circuit ground, and wherein the gate terminal of the read driver is controlled in part by a voltage drop caused by the light detected by the sensing circuit, and wherein a current through the read driver is proportional to a square of a difference between a gate-to-source voltage modified by the voltage drop and a threshold voltage of the read driver, wherein the sensing circuit comprises a first switch and a first sensing capacitor configured to sample a first leakage current during an initialization phase of a light sensing operation of the LSEC, and the sensing circuit further comprises a second switch and a second sensing capacitor configured to sample a second leakage current during a sensing phase of the light sensing operation of the LSEC, wherein a difference between the first leakage current and the second leakage current is used to detect an image on the multi-mode display.

2. The multi-mode display of claim 1, wherein the LSEC comprises:

a first light emitting circuit configured to control a diode to generate light in a light emitting operation of the LSEC; and a first light sensing circuit configured to control the diode to detect light in the light sensing operation of the LSEC.

3. The multi-mode display of claim 2, the first light emitting circuit is further configured to:

store electric charges in an initialization phase of the light emitting operation in a capacitor; and set the diode in a forward bias condition for emitting light in an emitting phase of the light emitting operation.

4. The multi-mode display of claim 2, the first light sensing circuit is further configured to:

discharge electric charges stored in the LSEU in the initialization phase of the light sensing operation; and set the diode in a reverse bias condition for detecting light in the sensing phase of the light sensing operation.

5. The multi-mode display of claim 2, wherein the first light emitting circuit comprises:

a write switch being configured to control a write driver, and the write driver being configured to drive a current to an anode terminal of the diode.

6. The multi-mode display of claim 2, wherein the first light sensing circuit comprises:

a read switch coupled between the read driver and the first sensing capacitor or the second sensing capacitor via corresponding the first switch or the second switch.

7. The multi-mode display of claim 1, wherein the LSEC comprises:

a second light emitting circuit configured to control a light emitting diode to generate light in a light emitting operation of the LSEC; and a second light sensing circuit configured to control a light sensing diode to detect light in the light sensing operation of the LSEC.

8. The multi-mode display of claim 7, the second light emitting circuit is further configured to:

store electric charges in an initialization phase of the light emitting operation; and set the light emitting diode in a forward bias condition for emitting light in an emitting phase of the light emitting operation.

9. The multi-mode display of claim 7, the second light sensing circuit is further configured to:

discharge electric charges stored in the LSEU in the initialization phase of the light sensing operation; and set the light sensing diode in a reverse bias condition for detecting light in the sensing phase of the light sensing operation.

10. The multi-mode display of claim 7, wherein the second light emitting circuit comprises:

a write switch being configured to control a write driver, and the write driver being configured to drive a current to an anode terminal of the light emitting diode.

11. The multi-mode display of claim 7, wherein the second light sensing circuit comprises:

a read switch coupled between the read driver and the first sensing capacitor or the second sensing capacitor via corresponding the first switch or the second switch.

12. A method for controlling a multi-mode display, comprising:

providing an array of light sensing and emitting units (LSEUs), wherein each LSEU in the array of LSEUs comprises a light sensing and emitting component (LSEC);

generating addresses for accessing one or more LSEUs in the array of LSEUs with a decoder; and controlling the array of LSEUs using the addresses with a controller, wherein the controller includes an emitting circuit configured to generate light using the LSEC, and a sensing circuit configured to detect light using the LSEC, wherein the sensing circuit includes a read driver, wherein a rate terminal of the read driver is directly connected to a diode in the LSEC and a cathode terminal of the diode is directly connected to a power source through a drain terminal of a pull up transistor and a source terminal of the pull up transistor is directly connected to the power source, wherein an anode terminal of the diode is directly connected to a circuit ground, and wherein the gate terminal of the read driver is controlled in part by a voltage drop caused by the light detected by the sensing circuit, and wherein a current through the read driver is proportional to a square of a difference between a gate-to-source voltage modified by the voltage drop and a threshold voltage of the read driver, wherein the sensing circuit comprises a first switch and a first sensing capacitor configured to sample a first leakage current during an initialization phase of a light sensing operation of the LSEC, and the sensing circuit further comprises a second switch and a second sensing capacitor configured to sample a second leakage current during a sensing phase of the light sensing operation of the LSEC, wherein a difference between the first leakage current and the second leakage current is used to detect an image on the multi-mode display.

13. The method of claim 12, wherein controlling the array of LSEUs comprises:
for each LSEU in the array of LSEUs,
controlling a diode to generate light in a light emitting operation of the LSEC using a first light emitting circuit; and
controlling the diode to detect light in the light sensing operation of the LSEC using a first light sensing circuit.

14. The method of claim 13, wherein controlling a diode to generate light in a light emitting operation of the LSEC comprises:
storing electric charges in an initialization phase of the light emitting operation in a capacitor, and
setting the diode in a forward bias condition for emitting light in an emitting phase of the light emitting operation.

15. The method of claim 13, wherein controlling the diode to detect light in the light sensing operation of the LSEC comprises:
discharging electric charges stored in the LSEU in the initialization phase of the light sensing operation; and
setting the diode in a reverse bias condition for detecting light in the sensing phase of the light sensing operation.

16. The method of claim 13, wherein the first light emitting circuit comprises:
a write switch being configured to control a write driver, and the write driver being configured to drive a current to an anode terminal of the diode.

17. The method of claim 13, wherein the first light sensing circuit comprises:
a read switch coupled between the read driver and the first sensing capacitor or the second sensing capacitor via corresponding the first switch or the second switch.

18. The method of claim 12, wherein controlling the array of LSEUs comprises:
for each LSEU in the array of LSEUs,
controlling a light emitting diode to generate light in a light emitting operation of the LSEC using a second light emitting circuit; and
controlling a light sensing diode to detect light in the light sensing operation of the LSEC using a second light sensing circuit.

19. The method of claim 18, wherein controlling a light emitting diode to generate light in a light emitting operation of the LSEC comprises:
storing electric charges in an initialization phase of the light emitting operation in a capacitor, and
setting the light emitting diode in a forward bias condition for emitting light in an emitting phase of the light emitting operation.

20. The method of claim 18, wherein controlling a light sensing diode to detect light in the light sensing operation of the LSEC comprises:
discharging electric charges stored in the LSEU in the initialization phase of the light sensing operation; and
setting the light sensing diode in a reverse bias condition for detecting light in the sensing phase of the light sensing operation.

21. The method of claim 18, wherein the second light emitting circuit comprises:
a write switch being configured to control a write driver, and the write driver being configured to drive a current to an anode terminal of the light emitting diode.

22. The method of claim 18, wherein the second light sensing circuit comprises:
a read switch coupled between the read driver and the first sensing capacitor or the second sensing capacitor via corresponding the first switch or the second switch.

23. A multi-mode display, comprising:
an array of light sensing and emitting units (LSEUs), wherein each LSEU in the array of LSEUs comprises a light sensing and emitting component (LSEC);
means for generating addresses for accessing one or more LSEUs in the array of LSEUs; and
means for controlling the array of LSEUs using the addresses, wherein the means for controlling the array of LSEUs includes an emitting circuit configured to generate light using the LSEC, and a sensing circuit configured to detect light using the LSEC,
wherein the sensing circuit includes a read driver, wherein a gate terminal of the read driver is directly connected to a diode in the LSEC and a cathode terminal of the diode is directly connected to a power source through a drain terminal of a pull up transistor and a source terminal of the pull up transistor is directly connected to the power source, wherein an anode terminal of the diode is directly connected to a circuit ground, and wherein the gate terminal of the read driver is controlled in part by a voltage drop caused by the light detected by the sensing circuit, and wherein a current through the read driver is proportional to a square of a difference between a gate-to-source voltage modified by the voltage drop and a threshold voltage of the read driver,
wherein the sensing circuit comprises a first switch and a first sensing capacitor configured to sample a first leakage current during an initialization phase of a light sensing operation of the LSEC, and the sensing circuit further comprises a second switch and a second sensing capacitor configured to sample a second leakage current during a sensing phase of the light sensing operation of the LSEC, wherein a difference between the first leakage current and the second leakage current is used to detect an image on the multi-mode display.

24. The multi-mode display of claim 23, wherein means for controlling the array of LSEUs comprises:
means for controlling a diode to generate light in a light emitting operation of the LSEC; and
means for controlling the diode to detect light in the light sensing operation of the LSEC.

25. The multi-mode display of claim 24, wherein means for controlling the diode to generate light in the light emitting operation of the LSEC comprises:
means for storing electric charges in an initialization phase of the light emitting operation; and
means for setting the diode in a forward bias condition for emitting light in an emitting phase of the light emitting operation.

26. The multi-mode display of claim 24, wherein the means for controlling the diode to detect light in the light sensing operation of the LSEC comprises:
means for discharging electric charges stored in the LSEU in the initialization phase of the light sensing operation; and
means for setting the diode in a reverse bias condition for detecting light in the sensing phase of the light sensing operation.

27. The multi-mode display of claim 23, wherein the means for controlling the array of LSEUs comprises:
means for controlling a light emitting diode to generate light in a light emitting operation of the LSEC; and means for controlling a light sensing diode to detect light in the light sensing operation of the LSEC.

28. The multi-mode display of claim 27, wherein the means for controlling the light emitting diode to generate light in the light emitting operation of the LSEC comprises:
means for storing electric charges in an initialization phase of the light emitting operation; and
means for setting the light emitting diode in a forward bias condition for emitting light in an emitting phase of the light emitting operation.

29. The multi-mode display of claim 27, wherein the means for controlling a light sensing diode to detect light in the light sensing operation of the LSEC comprises:
means for discharging electric charges stored in the LSEU in the initialization phase of the light sensing operation; and
means for setting the light sensing diode in a reverse bias condition for detecting light in the sensing phase of the light sensing operation.

\* \* \* \* \*